US 9,308,852 B2

(12) United States Patent
Kibler et al.

(10) Patent No.: US 9,308,852 B2
(45) Date of Patent: Apr. 12, 2016

(54) METHOD OF MANUFACTURING A TRAILER

(71) Applicant: MAC Trailer Manufacturing, Inc., Alliance, OH (US)

(72) Inventors: Scott A. Kibler, Kensington, OH (US); Denis Gosselin, Saint-Georges (CA)

(73) Assignee: MAC TRAILER MANUFACTURING, INC., Alliance, OH (US)

( * ) Notice: Subject to any disclaimer, the term of this patent is extended or adjusted under 35 U.S.C. 154(b) by 150 days.

(21) Appl. No.: 14/312,835

(22) Filed: Jun. 24, 2014

(65) Prior Publication Data
US 2015/0007436 A1    Jan. 8, 2015

Related U.S. Application Data

(60) Provisional application No. 61/842,243, filed on Jul. 2, 2013.

(51) Int. Cl.
*B60P 3/22* (2006.01)
*B62D 35/00* (2006.01)
*B60P 3/24* (2006.01)
*B23K 37/04* (2006.01)
(Continued)

(52) U.S. Cl.
CPC ............ *B60P 3/2205* (2013.01); *B23K 37/0408* (2013.01); *B60P 3/221* (2013.01); *B60P 3/243* (2013.01); *B62D 35/001* (2013.01); *B62D 65/02* (2013.01); *B62D 65/026* (2013.01); *B23K 37/0443* (2013.01); *B23K 2201/006* (2013.01); *B62D 33/046* (2013.01); *B62D 65/024* (2013.01); *Y10T 29/49622* (2015.01); *Y10T 29/49904* (2015.01); *Y10T 29/49968* (2015.01)

(58) Field of Classification Search
CPC .................. Y10T 29/49968; Y10T 29/49622; Y10T 29/49902; Y10T 29/49904; B23K 37/0443; B23K 2201/006; B23K 37/0408; B62D 65/026; B62D 65/024; B62D 65/02; B62D 33/046; B62D 21/20; B60P 3/221
See application file for complete search history.

(56) References Cited

U.S. PATENT DOCUMENTS

D90,896 S     10/1933  Perkins et al.
D93,190 S      8/1934  Thwaits
(Continued)

FOREIGN PATENT DOCUMENTS

FR    1091454    4/1955
FR    1560692    3/1969
(Continued)

OTHER PUBLICATIONS

Pneumatic Dry Bulk Tank—Trailer, www.flicker.com, https://www.flickr.com/photos/77979851@N05/8132184963, Oct. 28, 2012, 3 pages.
(Continued)

*Primary Examiner* — Jermie Cozart
(74) *Attorney, Agent, or Firm* — Sand & Sebolt

(57) ABSTRACT

A trailer and method of manufacturing a trailer are provided. The trailer has a storage vessel which may include hoppers and which is partially formed from a plurality of top wall segments having peaks. The peaks or other components may be angled relative to one another to provide improved aerodynamics. A jig is provided to facilitate the manufacturing process.

20 Claims, 19 Drawing Sheets

(51) Int. Cl.
   *B62D 65/02*   (2006.01)
   *B62D 33/04*   (2006.01)

(56) References Cited

U.S. PATENT DOCUMENTS

| | | | |
|---|---|---|---|
| D94,790 S | 3/1935 | Thwaits | |
| 2,185,030 A | 12/1939 | Lockwood | |
| D170,969 S | 12/1953 | Clough | |
| D193,294 S | 7/1962 | Mendez | |
| 3,058,753 A | 10/1962 | Carlsen | |
| 3,080,173 A | 3/1963 | Johnson et al. | |
| 3,419,310 A | 12/1968 | Gramlich | |
| 4,348,047 A | 9/1982 | Harshman | |
| 4,579,271 A * | 4/1986 | Fujita | B23K 37/04 228/46 |
| 5,326,156 A | 7/1994 | Heider et al. | |
| 5,819,970 A * | 10/1998 | Solimar | B60P 1/60 220/1.5 |
| 8,632,099 B2 | 1/2014 | Conny et al. | |
| 8,684,448 B2 | 4/2014 | Johnson et al. | |
| D716,701 S | 11/2014 | Beelman, III | |

FOREIGN PATENT DOCUMENTS

| | | |
|---|---|---|
| FR | 2372716 | 6/1978 |
| NL | 6410703 | 3/1965 |
| NL | 6617612 | 6/1967 |

OTHER PUBLICATIONS

Dry Bulk Trailer (Hopper), www.tradekorea.com, http://www.tradekorea.com/e-catalogue/icp2391/product-detail/P00066591/Dry_Bulk_Trailer_Hopper_.html#.U4SXk5yIUuA, Incheon Precision Ind Co., Ltd., document is undated but was printed from the pertinent website on May 29, 2014, 1 page.

Dry Bulk Trailer, www.engnetglobal.com, http://www.engnetglobal.com/c/c.aspx/DUN010/productdetail/bulk-tankers, DUCANMEC, document is undated but was printed from the pertinent website on May 29, 2014, 1 page.

Old Trailers Sport Aerodynamic Look, www.truckinginfo.com, http://www.truckinginfo.com/channel/equipment/article/story/2012/07/old-trailers-sport-aerodynamic-look.aspx, Jul. 2012, 11 pages.

Consumer Goods Trailers, www.heiltrailer.com, http://www.heiltrailer.com/Consumer-Goods-Trailers.aspx, Heil Trailer International, Co., document is undated but printed from the pertinent website on Jul. 10, 2013, 2 pages.

\* cited by examiner

METHOD OF MANUFACTURING A TRAILER

CROSS-REFERENCE TO RELATED APPLICATION

This application claims priority from U.S. Provisional Application Ser. No. 61/842,243, filed Jul. 2, 2013, the disclosure of which is incorporated herein by reference.

BACKGROUND

1. Field of Invention

The present invention relates generally to a towable over-the-road trailer and systems and methods for making such a trailer, wherein the trailer may be a tanker style trailer such as a bulk tank trailer which may be a pneumatic trailer.

2. Description of Related Art

There are many types of over-the-road trailers, including tanker trailers and bulk tank trailers which have a storage vessel which defines an enclosed interior chamber for carrying cargo. While tanker trailers are typically used for carrying liquid cargo in its storage vessel, bulk tank trailers are configured for carrying solid particulate material in its storage vessel. For instance, bulk tank trailers may be used to transport items such as sand, plastic pellets, flour, sugar, feed, fly ash and or other particulate material. Bulk tank trailers may be pneumatic to assist in quickly unloading the particulate material therefrom.

Wind resistance has been an ongoing issue for trailers and other vehicles while traveling down highways and other roads. Thus, there is a need for a trailer with improved aerodynamic features and methods of manufacturing such a trailer.

SUMMARY

In one aspect, the invention may provide a method comprising the steps of providing first, second and third top wall segments to be used in forming a trailer storage vessel; wherein the first, second and third top wall segments are initially separate from one another and have respective front and back edges; each of the top wall segments is curved as viewed from a front of the respective top wall segment; the first top wall segment has a first peak extending from adjacent the front edge of the first top wall segment to adjacent the back edge of the first top wall segment; the second top wall segment has a second peak extending from adjacent the front edge of the second top wall segment to adjacent the back edge of the second top wall segment; and the third top wall segment has a third peak extending from adjacent the front edge of the third top wall segment to adjacent the back edge of the third top wall segment; placing the first top wall segment into a jig in a first top wall segment inverted position so that the first peak is inverted; positioning the second top wall segment on a first lift of the jig in a second top wall segment inverted position so that the second peak is inverted and so that when the first lift is in a first lift position, the front edge of the second top wall segment is adjacent the back edge of the first top wall segment, and the inverted second peak angles upwardly and rearwardly; welding the front edge of the second top wall segment to the back edge of the first top wall segment while the first lift is in the first lift position; positioning the third top wall segment on the first lift in a third top wall segment inverted position so that the third peak is inverted and so that when the first lift is in a second lift position rearward of the first lift position, the front edge of the third top wall segment is adjacent the back edge of the second top wall segment, and the inverted third peak angles upwardly and rearwardly; and welding the front edge of the third top wall segment to the back edge of the second top wall segment while the first lift is in the second lift position.

In another aspect, the invention may provide a method comprising the steps of providing first, second and third top wall segments to be used in forming a trailer storage vessel; wherein the first, second and third top wall segments are initially separate from one another and have respective front and back edges; each of the top wall segments is curved as viewed from a front of the respective top wall segment; the first top wall segment has a first peak extending from adjacent the front edge of the first top wall segment to adjacent the back edge of the first top wall segment; the second top wall segment has a second peak extending from adjacent the front edge of the second top wall segment to adjacent the back edge of the second top wall segment; and the third top wall segment has a third peak extending from adjacent the front edge of the third top wall segment to adjacent the back edge of the third top wall segment; placing the second top wall segment into a jig in a second top wall segment inverted position so that the second peak is inverted; positioning the first top wall segment on a first lift of the jig in a first top wall segment inverted position so that the first peak is inverted and so that when the first lift is in a first lift position, the front edge of the second top wall segment is adjacent the back edge of the first top wall segment, and the inverted first peak angles upwardly and forward; welding the front edge of the second top wall segment to the back edge of the first top wall segment while the first lift is in the first lift position; positioning the third top wall segment on a second lift of the jig in a third top wall segment inverted position so that the third peak is inverted and so that when the second lift is in a second lift position rearward of the first lift position, the front edge of the third top wall segment is adjacent the back edge of the second top wall segment, and the inverted third peak angles upwardly and rearwardly; and welding the front edge of the third top wall segment to the back edge of the second top wall segment while the second lift is in the second lift position.

BRIEF DESCRIPTION OF SEVERAL VIEWS OF THE DRAWINGS

One or more sample embodiments that illustrate the best mode(s) are set forth in the drawings and in the following description. The appended claims particularly and distinctly point out and set forth the invention.

Similar numbers refer to similar parts throughout the drawings.

DETAILED DESCRIPTION

Figure 1:
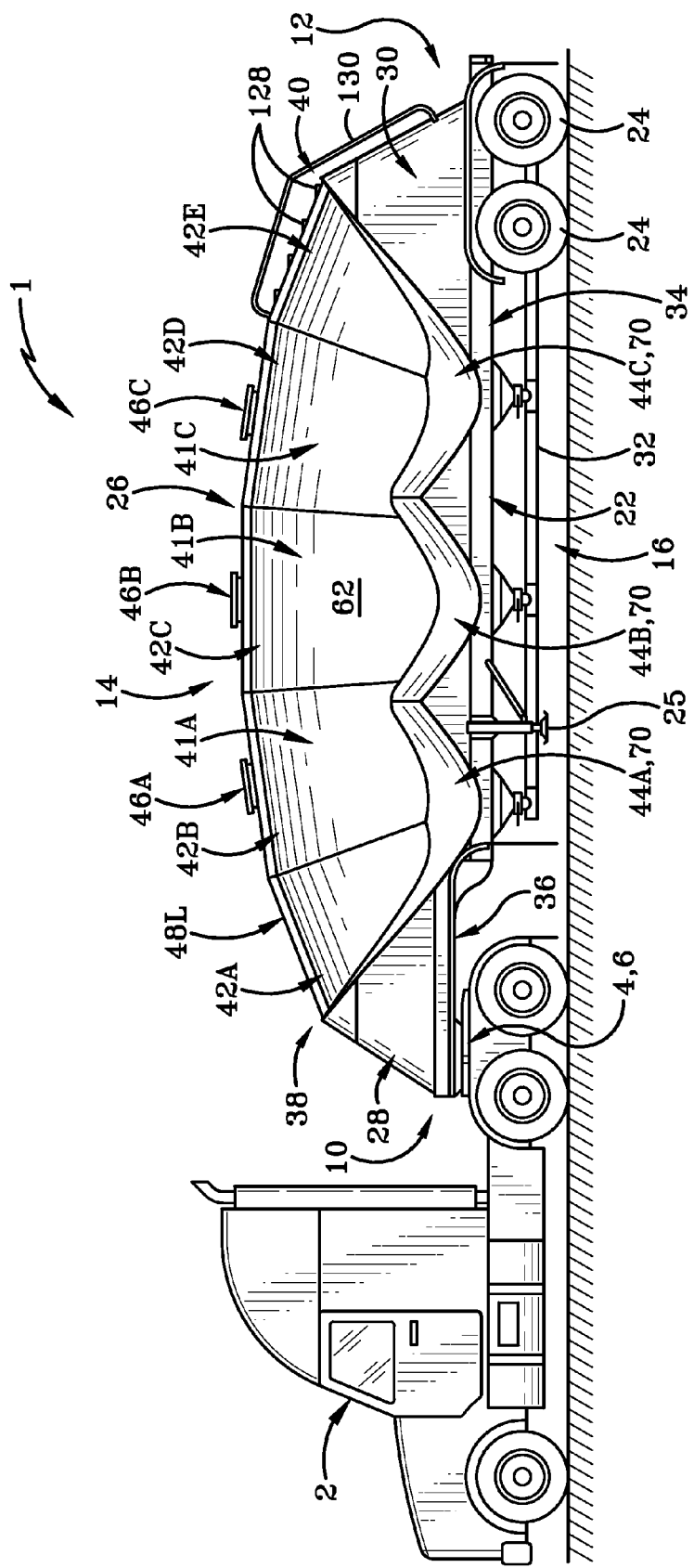
FIG. 1 is a side elevation view of a sample embodiment of a trailer which has a storage vessel and is hitched to a truck.

A trailer is shown generally at 1 in FIG. 1 and is shown here in the form of a pneumatic bulk tank trailer. It is noted that trailer 1 may be a different type of trailer and that the method of manufacturing discussed further below may be used to manufacture other types of trailers. Trailer 1 is a towed vehicle which is typically towed by a towing vehicle in the form of an on-road tractor 2 whereby trailer 1 and tractor 2 form a tractor trailer rig in the form of a bulk tanker. Tractor 2 includes a tractor frame, a cab mounted on the tractor frame, ground-engaging wheels rotatably mounted on the frame, an engine mounted on the frame and operatively connected to at least a pair of the wheels to drive rotation of the wheels and thus drive forward and rearward travel of tractor 2, and other standard components as well understood in the art. The front of trailer 1 is pivotally hitched to the rear of tractor 2 via a hitch 4 such as a fifth wheel hitch member 6 of tractor 2 and a trailer hitch member such as a kingpin 8 of trailer 1 coupled to hitch member 6. Trailer 1 has a front or front end 10 and a back or back end 12 defining therebetween a longitudinal direction of trailer 1 and its various components. Trailer 1 further has a top 14, a bottom 16 and left and right sides 18 and 20 (FIG. 3) defining therebetween an axial direction of trailer 1 and its various components.

Trailer 1 includes a rigid frame 22 which extends from adjacent front end 10 to adjacent rear end 12. Trailer 1 further includes ground-engaging wheels 24 which are rotatably mounted on frame 22 adjacent rear end 12 and facilitate rolling movement of trailer 1 along the ground. Trailer 1 further includes landing gear 25 secured to frame 22 along the front half of trailer 1, wherein landing gear 25 has lower portions or feet which are movable between a raised position in which the feet of landing gear 25 are out of contact with the ground to allow for rolling movement of the trailer when hitched to the tractor 2 and a lowered position in which the feet contact the ground to support the front portion of trailer 1 when detached or unhitched from tractor 2. Trailer 1 further includes a rigid storage vessel 26 rigidly secured to frame 22, a rigid front housing 28 which is rigidly secured to front portion of frame 22 and extends upwardly therefrom to a rigid connection with the front portion of the vessel 26, and a rear housing 30 which is rigidly secured to a rear portion of frame 22 adjacent rear end 12 and extends upwardly therefrom to a rigid connection with a rear portion of vessel 26. Trailer 1 also includes a longitudinally elongated aeration discharge pipe 32 which is secured to the bottom of vessel 26 and is configured for discharging particulate material from vessel 26. Pipe 32 defines a longitudinally elongated passage 33.

Figure 2:
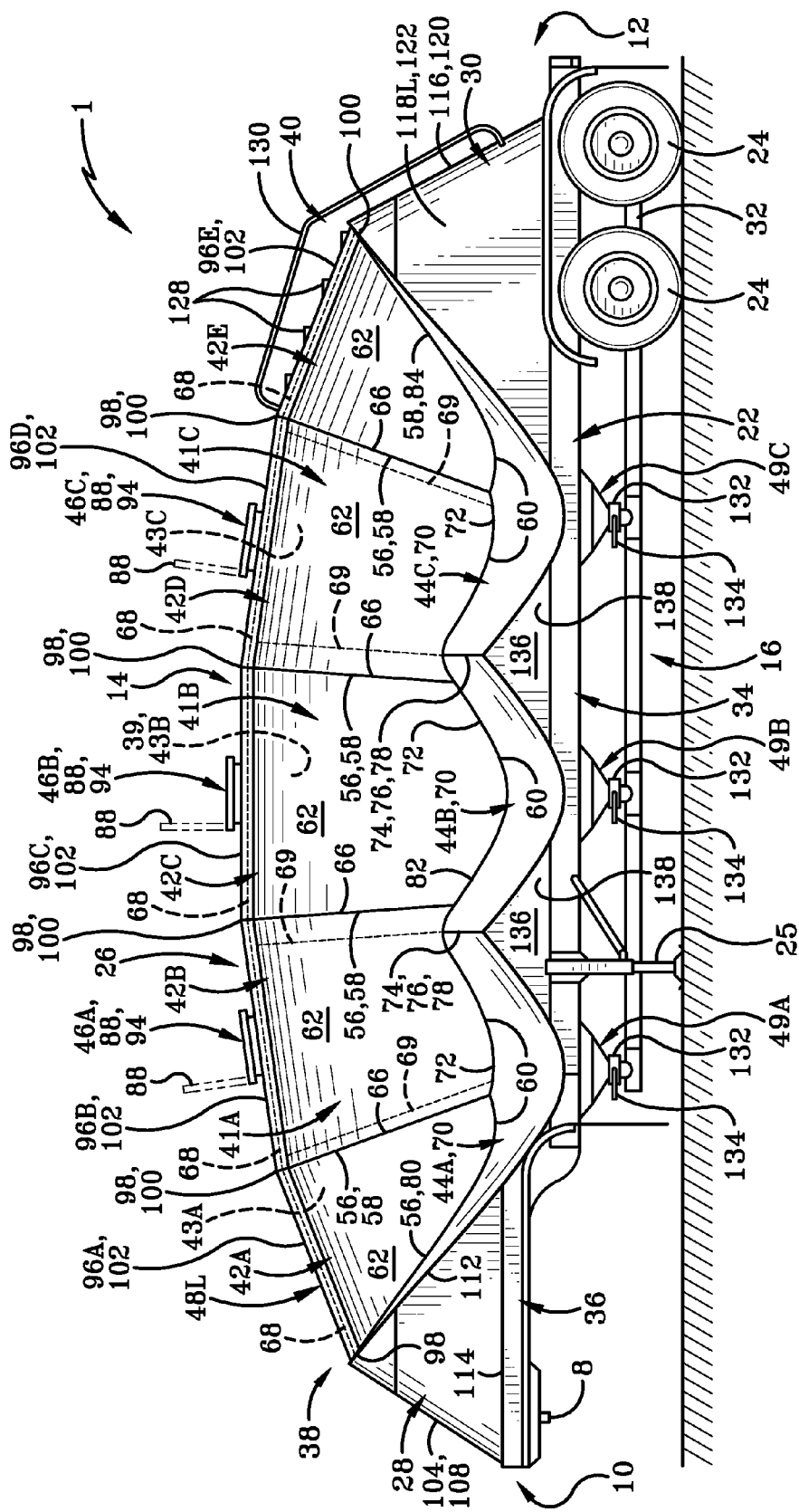
FIG. 2 is a side elevation view of the trailer.

With primary reference to FIG. 2, frame 22 includes a rear lower section 34 and front or forward raised section 36 which is rigidly secured to rigid section 34. Rigid section 34 extends from adjacent rear end 12 of trailer 1 forward over half the longitudinal length of trailer 1 to a front end which is secured to a rear end of the raised section 36, which extends forward therefrom to the adjacent front end of 10. Wheels 24 are mounted on rear section 34 adjacent a rear end thereof. Landing gear 25 is secured to rear section 34 adjacent a forward end thereof. Hitch 8 is secured to front section 36 adjacent a front end thereof and adjacent front end 10.

With primary reference to FIGS. 2-5, storage vessel 26 has a front end 38 and a rear end 40 defining therebetween a longitudinal direction of vessel 26, which is the same as the longitudinal direction of trailer 1. Front end 38 is adjacent and rearward of front end 10, whereas rear end 40 is adjacent and forward of rear end 12. Ends 38 and 40 define therebetween a longitudinal length of vessel 26 which may be at least 70, 80 or 90% of the full length of trailer 1 defined between front and rear ends 10, 12 of trailer 1. Vessel 26 includes a plurality of rigid top wall segments 42 and a plurality of rigid bottom wall segments 44. The sample embodiment of vessel 26 has five top wall segments 42A-42E and three bottom wall segments 44A-44C. In the sample embodiment, top wall segments 42A and 42D are essentially identical although each is in a reverse orientation to the other as part of vessel 26 such that they may be mirror images of one another. This may likewise be true of top wall segments 42B and 42D, and also true of bottom wall segments 44A and 44C.

Segment 42A may be referred to herein as the front or frontmost top wall segment. Likewise, segment 42E may be referred to herein as the back, rear or rearmost top wall segment. Each of segments 42B, 42C, and 42D may be referred to herein as intermediate top wall segments in that each of them is located longitudinally intermediate at least two of the other top wall segments. Segment 42C may also be referred to herein as the center or central top wall segment. Segment 44A may be referred to herein as the front or frontmost bottom wall segment while segment 44C may be referred to herein as the rear or rearmost bottom wall segment. Segment 44B may be referred to herein as an intermediate, center or central bottom wall segment given that it is longitudinally intermediate at least two bottom wall segments, 44A and 44C in the sample embodiment.

Vessel 26 includes three hoppers or hopper sections 41A-41C wherein hopper 41A may be referred to as a front or frontmost hopper or hopper section, hopper 41C may be referred to as a rear or rearmost hopper or hopper section and hopper 41B may be referred to as an intermediate, center or central hopper or hopper section. Hopper 41A is formed primarily from bottom wall segment 44A and top wall segments 42A and 42B. Hopper 41A is formed primarily from bottom wall segment 44B and top wall segment 42C. Hopper 41C is formed primarily from bottom wall segment 44C and top wall segments 42D and 42E. Vessel 26 defines a storage vessel interior storage chamber 39 which extends from adjacent front end 38 to adjacent back end 40, from adjacent the left side 18 of vessel 26 and trailer 1 to adjacent the right side 20 of vessel 26 and trailer 1, and from adjacent the top 14 of vessel 26, segments 42, hoppers 41 and trailer 1 to adjacent the bottom of vessel 26, segments 44 and hoppers 41 and generally adjacent to bottom 16 of trailer 1. Hopper 41A defines a hopper interior chamber 43A, hopper 41B defines a hopper interior chamber 43B directly behind and in fluid communication with chamber 43A, and hopper 41C defines a hopper interior chamber 43C directly behind and in fluid communication with chambers 43A and 43B. Each of chambers 43 makes up part of chamber 39. Chamber 43A is defined primarily by bottom wall segment 44A and top wall segments 42A and 42B. Chamber 43B is defined primarily by bottom wall segment 44B and top wall segment 42C. Chamber 43C is defined primarily by bottom wall segment 44C and top wall segments 42D and 42E. Each of chambers 39 and 43A-C may be configured to contain particulate material such as noted in the Background section of the present application. Vessel 26 also includes a plurality of fill port assemblies 46 and top beams or toe rails 48. More particularly, there are three fill port assemblies 46A-46C, wherein assembly 46A may be referred to as a front or frontmost fill port assembly; assembly 46B may be referred to as an intermediate, center or central fill port assembly; and assembly 46C may be referred to as a rear or rearmost fill port assembly. Toe rails 48 include a left toe rail 48L and a right toe rail 48R.

Figure 3:
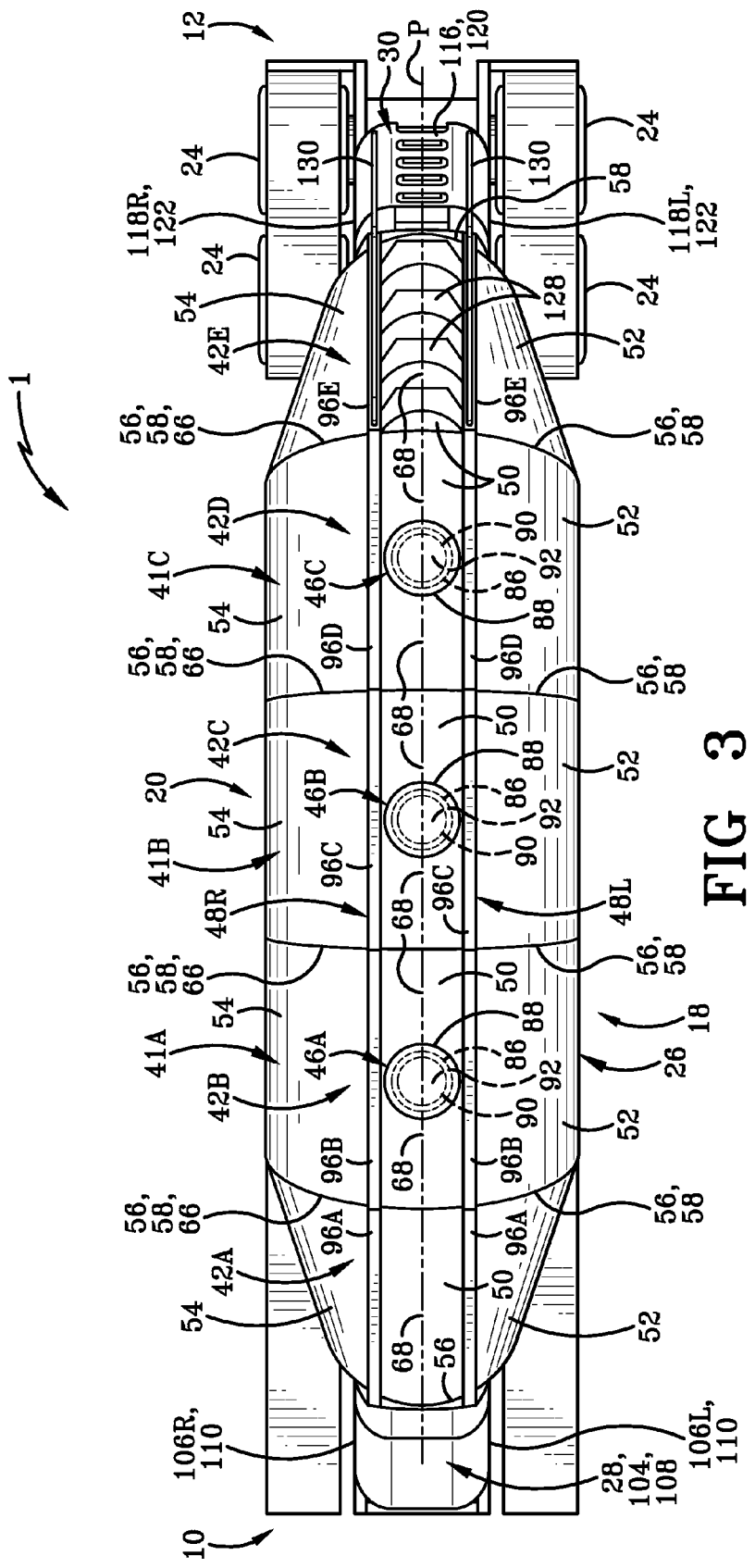
FIG. 3 is a top plan view of the trailer.
Figure 4:
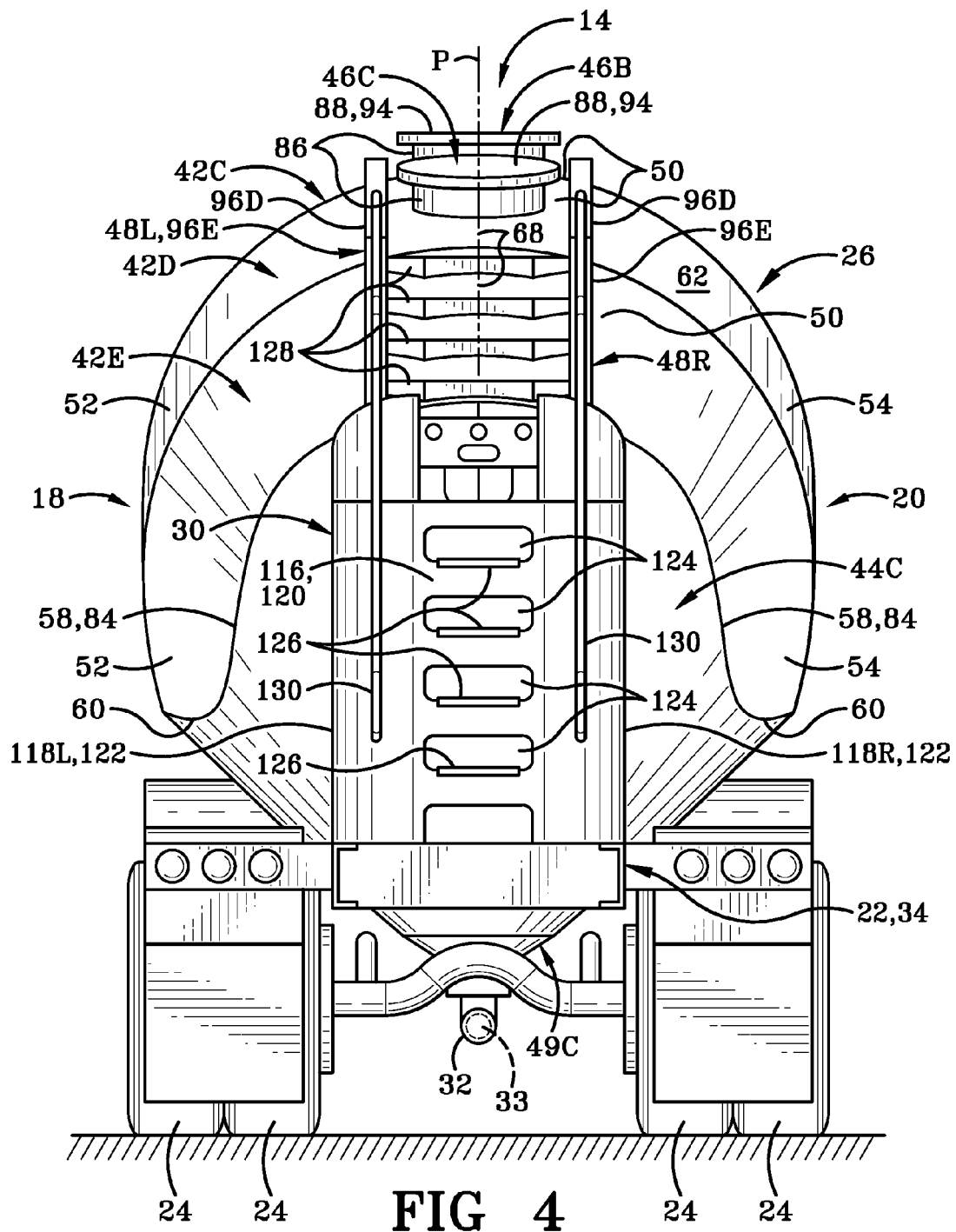
FIG. 4 is a rear elevation view of the trailer.
Figure 5:
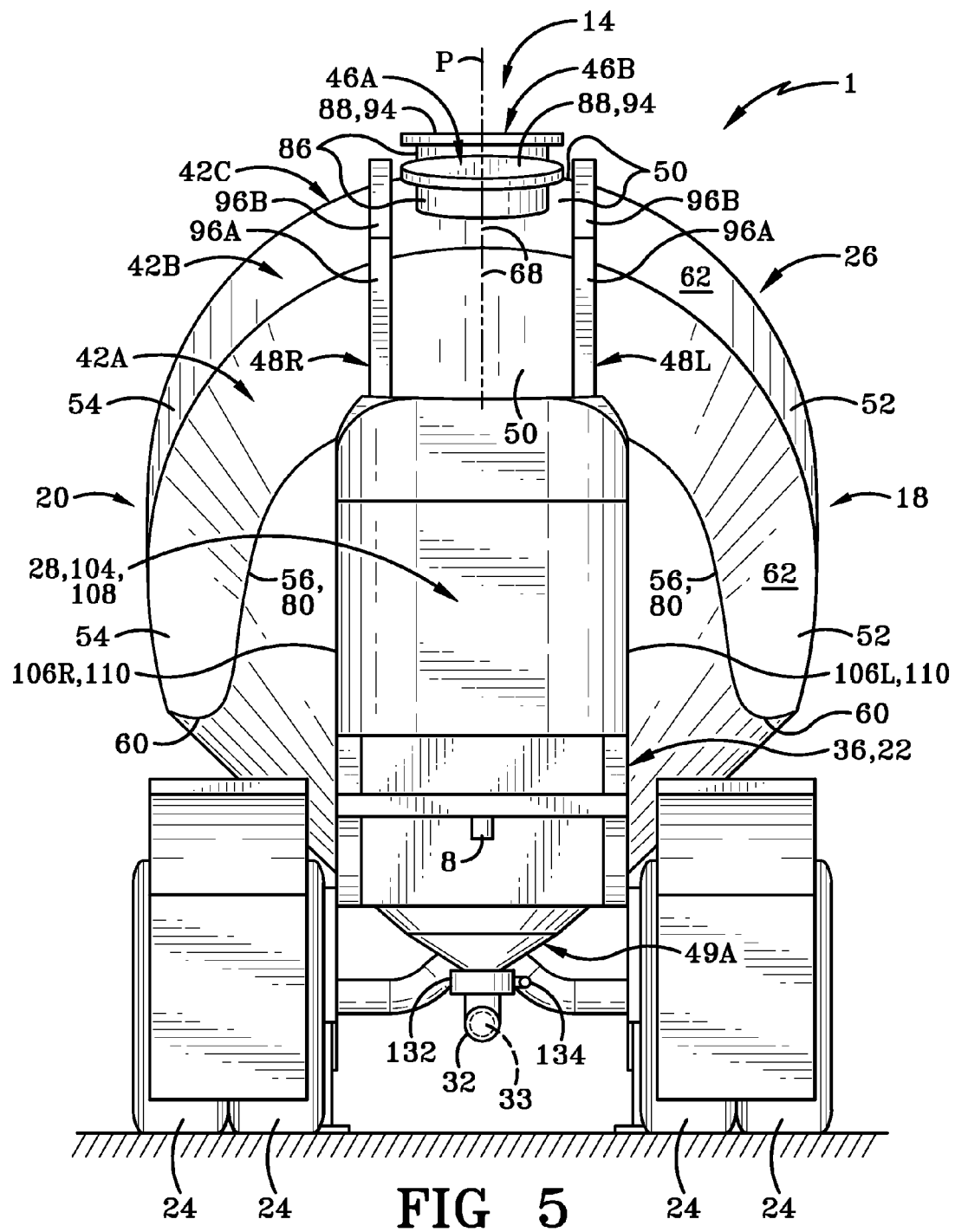
FIG. 5 is a front elevation view of the trailer.

In the sample embodiment, each of top wall segments 42 is formed of a single piece of sheet metal which has been bent into a curved, arcuate or U-shaped configuration such that the U-shape is an inverted U-shape in the upright position (FIGS. 1-5) of each top wall segment 42, wherein each top wall segment 42 has the inverted u-shaped configuration as viewed from the front or rear of the trailer or segment 42, as will be understood from FIGS. 4 and 5. The U-shaped configuration of each top wall segment 42 when in an inverted position may be seen in FIG. 10. Each top wall segment 42 includes a top wall portion 50 which extends along or adjacent top 14 of trailer 1, a left sidewall portion 52 which is secured to and extends downwardly from the left side of the corresponding top wall portion 50 along left side 18 of trailer 1, and a right sidewall portion 54 which is secured to and extends downwardly from the right side of top wall portion 50 along right side 20 of trailer 1. Each top wall segment 42 has a forward facing front edge 56, a rearward facing back edge 58, left and right downward facing bottom edges 60, an outer surface 62 which faces away from interior chamber 39 and forms an outer surface of vessel 26 and trailer 1, and an inner surface 64 which faces and defines a portion of interior chamber 39.

Figure 10:
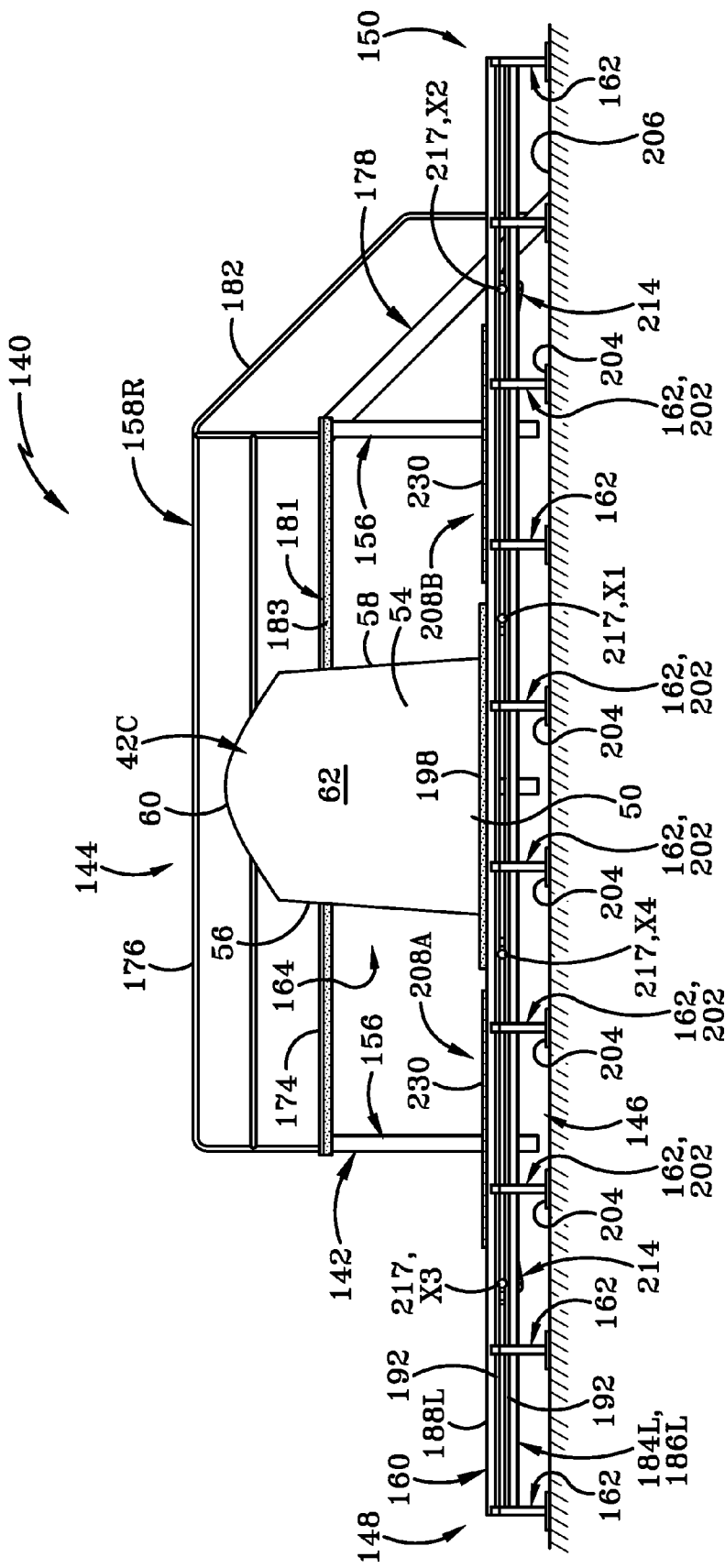
FIG. 10 is a side elevation view of the jig with various jig components along its left side removed and showing a top wall segment in the jig.

Each of front edges 56 has an inverted U-shaped configuration when viewed from the front in the upright position of top wall segments 42 (and an upright U-shaped configuration in the inverted position shown in FIG. 10). Each of back edges 58 as viewed from the rear of the trailer and of the respective wall segment 42 has an inverted U-shaped configuration in the upright position (and an upright U-shaped configuration in the inverted position of FIG. 10). Each of front edges 56 of top wall segments 42B, 42C, 42D and 42E is straight as viewed from the left side, right side or from above, and may be described as laying entirely in a corresponding plane. Similarly, each of back edges 58 of top wall segments 42A, 42B, 42C, and 42D is straight as viewed from the left side, right side or from above, and may be described as laying entirely in a corresponding plane. The front edge 56 of segment 42A is generally straight as viewed from the side and transitions via a gradual curve into arcuate bottom edge 60 of segment 42A. Similarly, back edge 58 of segment 42E is substantially straight along most of its length and gradually transitions via a shallow curve along its lower end to arcuate bottom edge 60 of segment 42E. Each of bottom edges 60 of segments 42B, 42C, and 42D are arcuate a viewed from the side and may have a serpentine configuration such that the edges as viewed from the side curve back and forth in opposite directions.

Outer surface 62 of each of the top wall segments 42 has an inverted U-shaped configuration as viewed from the front or back in the upright position of the trailer and top wall segments (and an upright U-shaped configuration in the inverted position shown in FIG. 10). Each outer surface 62 is convexly curved as viewed from the front or back in a continuous manner from the left bottom edge 60 to the right bottom edge 60 of the given top wall segment 42. Each inner surface 64 likewise has the same inverted or upright U-shaped configuration as noted with respect to outer surface 62, but differs in that inner surface 64 is concavely curved in a continuous manner as viewed from the front or rear from left bottom edge 60 to the right bottom edge 60. Outer surface 62 serves as the outer surface of portions 50, 52 and 54 of the respective top wall segment 42 whereby the outer surface 62 of each of said portions is convexly curved as viewed from the front or back. Similarly, inner surface 64 serves as the inner surface of each of portions 50, 52 and 54 such that the inner surfaces of the said portions are thus concavely curved as viewed from the front or back.

In the sample embodiment, the front edge 56 of top wall segment 42B is rigidly secured to the back edge 58 of top wall segment 42A by a seam or continuous weld 66 which extends along the entire length of said front edge 56 and back edge 58 from the intersection of front edge 56 and bottom edge 60 of segment 42B on the left side of segments 42A and 42B and from the intersection of back edge 58 and bottom edge 60 of segment 42A on the left side of segments 42A and 42B to the intersection of front edge 56 and bottom edge 60 of segment 42B on the right side of segments 42A and 42B and to the intersection of back edge 58 and bottom edge 60 of segment 42A on the right side of segments 42A and 42B. Likewise, the front edge 56 of top wall segment 42C is rigidly secured to the back edge 58 of top wall segment 42B by a seam or continuous weld 66 which extends along the entire length of said front edge 56 and back edge 58 from the intersection of front edge 56 and bottom edge 60 of segment 42C on the left side of segments 42B and 42C and from the intersection of back edge 58 and bottom edge 60 of segment 42B on the left side of segments 42B and 42C to the intersection of front edge 56 and bottom edge 60 of segment 42C on the right side of segments 42B and 42C and to the intersection of back edge 58 and bottom edge 60 of segment 42B on the right side of segments 42B and 42C. Similarly, the front edge 56 of top wall segment 42D is rigidly secured to the back edge 58 of top wall segment 42C by a seam or continuous weld 66 which extends along the entire length of said front edge 56 and back edge 58 from the intersection of front edge 56 and bottom edge 60 of segment 42D on the left side of segments 42C and 42D and from the intersection of back edge 58 and bottom edge 60 of segment 42C on the left side of segments 42C and 42D to the intersection of front edge 56 and bottom edge 60 of segment 42D on the right side of segments 42C and 42D and to the intersection of back edge 58 and bottom edge 60 of segment 42C on the right side of segments 42C and 42D. Likewise, the front edge 56 of top wall segment 42E is rigidly secured to the back edge 58 of top wall segment 42D by a seam or continuous weld 66 which extends along the entire length of said front edge 56 and back edge 58 from the intersection of front edge 56 and bottom edge 60 of segment 42E on the left side of segments 42D and 42E and from the intersection of back edge 58 and bottom edge 60 of segment 42D on the left side of segments 42D and 42E to the intersection of front edge 56 and bottom edge 60 of segment 42E on the right side of segments 42D and 42E and to the intersection of back edge 58 and bottom edge 60 of segment 42D on the right side of segments 42D and 42E.

Vessel 26 may further include rigid U-shaped reinforcing ribs 69 which are rigidly secured to inner surface 64 of one of segments 42 and extends therefrom into interior chamber 39. Each of ribs 69 is shown adjacent and longitudinally offset from a respective weld 66. Each rib 60 may have an inverted U-shaped configuration as viewed in the longitudinal direction and be straight as viewed from the side. Each rib 69 may be essentially parallel to the weld 66 that the rib 69 is adjacent. Ribs 69 are typically formed of metal and secured to inner surface 64 by one or more welds.

With primary reference to FIGS. 2-5, each top wall segment 42 has a peak 68 which extends along outer surface 62 at the top of each segment 42. Each peak 68 is typically a longitudinally elongated straight line or lies along a longitudinally elongated straight line along surface 62. Each peak 68 in the exemplary embodiment lies along a central line or central longitudinally elongated vertical plane P (FIGS. 3-5) which is about midway between left and right sides 18 and 20 of vessel 26 and trailer 1.

Peak 68 of front segment 42A extends from the front end 56 to the back end 58 of segment 42A along its top portion 50. Likewise, peak 68 of back segment 42E extends from the front end 56 to the back end 58 of segment 42E along its top portion 50. Peak 68 of segment 42B has two segments which extend along its top portion 50, a forward segment which extends from front end 56 of segment 42B to the front of a port wall of assembly 46A, and a rear segment which extends from the back of the port wall of assembly 46A to the back end 58 of segment 42B. Before a port hole is cut through segment 42B top portion 50 and assembly 46A is secured to segment 42B, peak 68 of segment 42B extends continuously in a single segment from the front end 56 to the back end 58 of segment 42B. Similarly, peak 68 of segment 42C has two segments which extend along its top portion 50, a forward segment which extends from front end 56 of segment 42C to the front of a port wall of assembly 46B, and a rear segment which extends from the back of the port wall of assembly 46B to the back end 58 of segment 42C. Before a port hole is cut through segment 42C top portion 50 and assembly 46B is secured to segment 42C, peak 68 of segment 42C extends continuously in a single segment from the front end 56 to the back end 58 of segment 42C. Likewise, peak 68 of segment 42D has two segments which extend along its top portion 50, a forward segment which extends from front end 56 of segment 42D to the front of a port wall of assembly 46C, and a rear segment which extends from the back of the port wall of assembly 46C to the back end 58 of segment 42D. Before a port hole is cut through segment 42D top portion 50 and assembly 46O is secured to segment 42D, peak 68 of segment 42D extends continuously in a single segment from the front end 56 to the back end 58 of segment 42D.

In the sample embodiment, peak 68 of center segment 42C is substantially horizontal, peak 68 of segment 42B angles forward and downward slightly from the front peak 68 of segment 42C at an incline, and peak 68 of segment 42A angles forward and downward from the front of peak 68 of segment 42B at an incline greater than that of segment 42B peak 68. Similarly, peak 68 of segment 42D angles rearward and downward from the back end of peak 68 of segment 42C at an incline, and peak 68 of segment 42E angles downwardly or rearwardly from the back end of peak 68 of segment 42D at an incline greater than that of segment 42D peak 68. Various angles are defined between the various peaks which will be discussed further below.

Each bottom wall segment 44 includes a conical or a frustoconical sidewall 70 having an upwardly facing top edge 72. Top edge 72 has a somewhat complex shape and is generally U-shaped as viewed from the side. Top edge 72 of sidewall 70 of bottom wall segment 44A is substantially identical to that of bottom wall segment 44C, although one is in the reverse orientation of the other whereby they may be considered mirror images of one another. Each of bottom wall segments 44A and 44B has a rearwardly facing back edge 74 which is U-shaped as viewed from the rear and which is typically straight and substantially vertical when viewed from the side whereby said back edges 74 may in their entirety lie on respective axially extending substantially vertical planes. Each of bottom wall segments 44B and 44C have forward facing front edges 76 which are U-shaped as viewed from the front and may be straight and substantially vertical as viewed from the side whereby said front edges 76 may lie in respective axially extending substantially vertical planes. Back edge 74 of front segment 44A and front edge 76 of intermediate segment 44B are rigidly secured to one another along a continuous seam or weld 78 which extends continuously along the entire length of each of segment 44A back edge 74 and segment 44B front edge 76. Similarly, back edge 74 of segment 44B and front edge 76 of back segment 44C are rigidly secured to one another along a continuous seam or weld 78 which extends continuously along the entire length of each of segment 44B back edge 74 and segment 44C front edge 76. Each weld 78 is U-shaped as viewed from the front or back, and may be vertical and straight as viewed from the side and thus may essentially lie entirely on one of the above noted axially extending vertical planes along which the corresponding edges 74 and 76 lie or along another such plane closely adjacent the above-noted planes.

Top edge 72 of front bottom wall segment 44A is rigidly secured by a weld 80 to bottom edges 60 of top wall segments 42A and 42B and front edge 56 of segment 42A. Weld 80 has a relatively complex configuration and extends along the entire length of bottom edge 60 of segment 42A and along most of the bottom edge 60 of segment 42B. Top edge 72 of bottom segment 44B sidewall 70 is rigidly secured by a weld 82 to the bottom edge 60 of top wall segment 44C along the entire length of said bottom edge 60. A front end portion of top edge 72 of segment 44B is secured by a front portion of weld 82 to a rear portion of the bottom edge 60 of top wall segment 42B. A rear portion of top edge 72 of central segment 44B is secured by a rear portion of weld 82 to a front portion of the bottom edge 60 of segment 42D. Top edge 72 of segment 44C sidewall 70 has a complex configuration and is rigidly secured by a weld 84 to the bottom edges 60 of segments 42D and 42E and rear edge 58 of segment 42E. Weld 84 extends continuously along the entire length of the bottom edge 60 of segment 42E and along most of the bottom edge 60 of segment 42D. Weld 84 is typically a substantial mirror image of weld 80.

With primary reference to FIGS. 2-5, each fill port assembly 46A-C includes a rigid port wall 86 and a rigid fill port lid 88 which is moveable between a closed position shown in solid lines in FIGS. 2-5 and an open position shown in dashed lines in FIG. 2. Each port wall 46 is rigidly secured to and extends upwardly from the top of one of the top wall segments between the left and right toe rails 48L and 48R. Assembly 46A port wall 86 is rigidly secured to and extends upwardly from the top of outer surface 62 of top wall segment 42B top wall portion 50. Assembly 46B port wall 86 is rigidly secured to and extends upwardly from the top of outer surface 62 of top wall segment 42C top wall portion 50. Assembly 46C port wall 86 is rigidly secured to and extends upwardly from the top of outer surface 62 of top wall segment 42D top wall portion 50.

Each port wall 86 has an inner surface 90 which defines a passage 92 extending from the top of the port wall to the bottom of the port wall and in communication with a hole formed through the corresponding top wall segment whereby passage 92 provides fluid communication between interior chamber 39 and atmosphere external to vessel 26 when the corresponding lid 88 is in the open position. Each lid 88 has a substantially flat and upwardly facing top surface 94 which is circular in the sample embodiment. Top surface 94 of assembly 46B lid 88 may be substantially horizontal. Top surface 94 of assembly 46A lid 88 angles downwardly and forward, while top surface 94 of assembly 46C lid 88 angles downwardly and rearwardly. Top surfaces 94 of assembly 46A lid 88 and assembly 46C lid 88 may be entirely lower than top surface 94 of assembly 46B lid 88. In the closed position of each lid 88, the given lid 88 closes passage 92 and thus closes communication between interior chamber 39 and atmosphere external to vessel 26. A seal may be mounted along the bottom surface of each of lids 88 and/or along the upper portion of a given port wall 86 in order to provide a seal between lid 88 and port wall 86 when lid 88 is in the closed position. The seal provided may be an airtight and/or watertight seal.

Each of left and right toe rails 48L and 48R include five toe rail segments 96A-E. Each toe rail segment 96 has front and back ends 98 and 100 between which the given segment 96 is longitudinally elongated. Each toe rail segment 96 further includes an upwardly facing top surface 102 which is longitudinally elongated and extends from front end 98 to back end 100. Each top surface 102 is straight from front end 98 to back end 100 as viewed from the side of the given toe rail segment 96 and trailer 1. With respect to each of the left and right toe rails 48L and 48R, the back end 100 of segment 96A is closely adjacent or in contact with the front end 98 of segment 96B and may be rigidly secured thereto by a weld; the back end 100 of segment 96B is closely adjacent or in contact with the front end 98 of segment 96C and may be rigidly secured thereto by a weld; the back end 100 of segment 96C is closely adjacent or in contact with the front end 98 of segment 96C and may be rigidly secured thereto by a weld; and the back end 100 of segment 96D is closely adjacent or in contact with the front end 98 of segment 96E and may be rigidly secured thereto by a weld.

As seen in FIG. 3, the left and right segments 96A are parallel and axially spaced from one another. Segments 96A are also parallel to peak 68 of top wall segment 42A and rigidly secured to and extend upwardly from outer surface 62 of segment 42A top wall portion 50 such that said peak 68 is essentially midway between segments 96A. As viewed from above, assembly 46A port wall 86 and lid 88 are directly between toe rail segments 96B and are directly between the tops of segment 42B front and back edges 56 and 58; assembly 46B port wall 86 and lid 88 are directly between toe rail segments 96C and are directly between the tops of segment 42C front and back edges 56 and 58; and assembly 46C port wall 86 and lid 88 are directly between toe rail segments 96D and are directly between the tops of segment 42D front and back edges 56 and 58.

The straight top surface 102 of toe rail segment 96C may be horizontal from its front end to its back end as viewed from the side of the toe rail and trailer. The straight top surface 102 of the rail segment 96B angles downwardly and forward from adjacent its back end 100 and the front end of segment 96C top surface 102 to adjacent front end 98 of segment 96B surface 102 and segment 96A surface 102 back end 100. Straight top surface 102 of segment 96A angles downwardly and forward at a greater incline than surface 102 of segment 96B from adjacent back end 100 of segment 96A and front end 98 of segment 96B to adjacent front end 98 of segment 96A and the top of front housing 28. Top surface 102 of segment 96D angles downwardly and rearwardly from adjacent back end 100 of segment 96C and front end 98 of segment 96D to adjacent back end 100 of segment 96D and the front end 98 of top surface 102 of segment 96E. Top surface 102 of segment 96E angles downwardly and rearwardly at a greater incline than surface 102 of segment 96D from adjacent back end 100 of segment 96D and front end 98 of segment 96E to adjacent back end 100 of segment 96E and the top of back housing 30.

With primary reference to FIGS. 2, 3 and 5, front housing 28 includes an angled front wall 104 and left and right sidewalls 106L and 106R which extend downwardly and rearwardly from adjacent front wall 104. Sidewalls 106 are triangular as viewed from the side. Front wall 104 has a flat front outer surface 108 which faces forward and upwardly. Each of sidewalls 106L and R has an outer surface 110 which is typically substantially vertical and parallel to plane P. Outer surfaces 110 face away from one another. The outer surface 110 of left side 106L faces to the left whereas outer surface 110 of right sidewall 106R faces to the right. Left and right side walls 106 have rear upper edges which angle downwardly and rearwardly and are secured to the front outer surface of sidewall 70 of bottom wall segment 44A by respective welds 112 which angle downwardly and rearwardly. Each of sidewalls 106 has a substantially horizontal bottom edge which is rigidly secured to front raised section 36 of frame 22 along a respective horizontal weld 114. Front housing 28 is thus rigidly secured to section 36 on frame 22 and to sidewall 70 of assembly 44A. Front wall 104 and front surface 108 thereof angle downward and forward from adjacent a top end of wall 104 and surface 108, from adjacent the front of top wall segment 42A peak 68 and from adjacent front ends 98 of the rails 96A to adjacent a front bottom end of wall 104 and surface 108 and the front end of front section 36 of frame 22. Wall 104 and surface 108 angle downwardly and forward at a greater incline than that of top surface 102 of segment 96A and segment 42A peak 68.

With primary reference to FIGS. 2-4, back housing 40 includes a flat angled back wall 116 and flat left and right sidewalls 118L and 118R which extend forward from adjacent back wall 116 via curved transitional walls. Sidewalls 118 are triangular as viewed from the side. Back wall 116 has a flat back outer surface 120 and side walls 118 have respective outer surfaces 122 which face away from one another and are typically perpendicular to back surface 120. Outer surface 122 of left sidewall 118L faces to the left, while outer surface 122 of right sidewall 118R faces to the right. Back surface 120 faces rearward and upwardly. Surface 120 angles downwardly and rearwardly from adjacent the back end 100 of rail segments 96E, from adjacent the back end of segment 42E peak 68, and from adjacent the upper end or edge of wall 116 and surface 120 to adjacent a lower end or edge of wall 116 and surface 120 and to adjacent the top of lower section 34 of frame 22 adjacent back end 12 of the frame and the trailer. Back surface 120 angles downwardly and rearwardly at a greater incline than does segment 42E peak 68 and the top surfaces 102 of rail segments 96E.

Figure 2A:
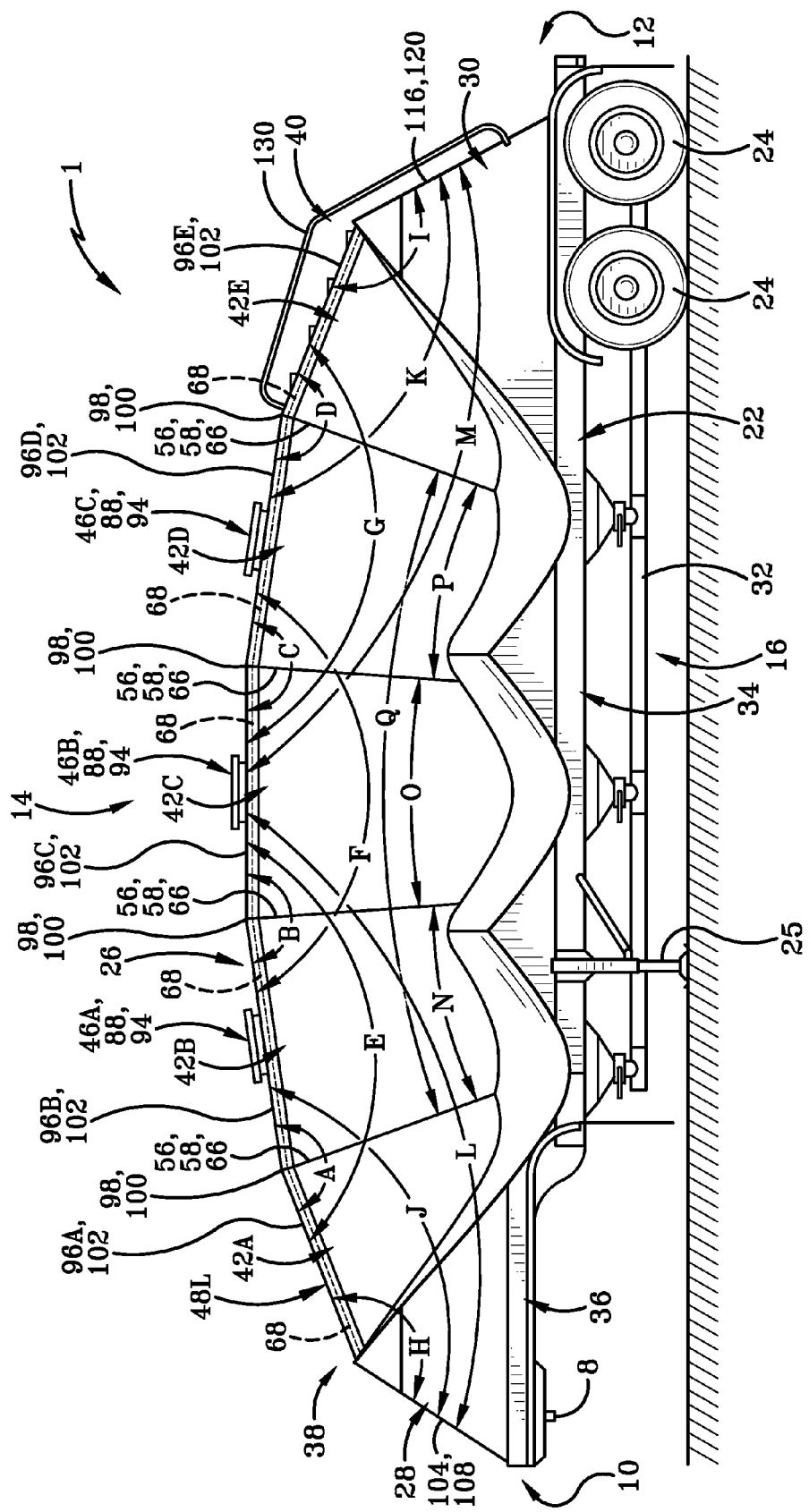
FIG. 2A is similar to FIG. 2 and shows various angles between certain components of the trailer.

With reference to FIG. 2A, the present paragraph provides angles between the various surfaces of trailer 1 as viewed from the side of the trailer and the side of the various trailer components. Top surface 102 of toe rail segment 96A and top surface 102 of toe rail segment 96B define therebetween an obtuse angle A. Surface 102 of segment 96B and surface 102 of segment 96C define there between an obtuse angle B. Surface 102 of segment 96C and surface 102 of segment 96D define there between an obtuse angle C. Surface 102 of segment 96D and surface 102 of segment 96E define therebetween an obtuse angle D. Surface 102 of segment 96A and surface 102 of segment 96C define therebetween and obtuse angle E. Surface 102 of segment 96B and surface 102 of segment 96D define therebetween and obtuse angle F. Surface 102 of segment 96C and surface 102 of segment 96E define therebetween and obtuse angle G. Front surface 108 of front wall 104 and surface 102 of segment 96A define therebetween an obtuse angle H. Surface 102 of segment 96E and back surface 120 of back wall 116 define therebetween an obtuse angle I. Surface 108 of wall 104 and surface 102 of segment 96B define therebetween an obtuse angle J. Surface 102 of segment 96D and surface 120 of wall 116 define therebetween an obtuse angle K. Surface 108 of wall 104 and surface 102 of segment 96C define therebetween an obtuse angle L. Surface 102 of segment 96C and surface 120 of wall 116 define therebetween an obtuse angle M. Each of (a) the back edge 58 of segment 42A, (b) the front edge 56 of segment 42B and (c) the weld 66 between segments 42A and 42B and each of (d) the back edge 58 of segment 42B, (e) the front edge 56 of segment 42C and (f) the weld 66 between segments 42B and 42C define therebetween an acute angle N. Each of (a) the back edge 58 of segment 42B, (b) the front edge 56 of segment 42C and (c) the weld 66 between segments 42B and 42C and each of (d) the back edge 58 of segment 42C, (e) the front edge 56 of segment 42D and (f) the weld 66 between segments 42C and 42D define therebetween an acute angle O. Each of (a) the back edge 58 of segment 42C, (b) the front edge 56 of segment 42D and (c) the weld 66 between segments 42C and 42D and each of (d) the back edge 58 of segment 42D, (e) the front edge 56 of segment 42E and (f) the weld 66 between segments 42D and 42E define therebetween an acute angle P. Each of (a) the back edge 58 of segment 42A, (b) the front edge 56 of segment 42B and (c) the weld 66 between segments 42A and 42B and each of (d) the back edge 58 of segment 42D, (e) the front edge 56 of segment 42E and (f) the weld 66 between segments 42D and 42E define therebetween an acute angle Q.

Each of angles A, B, C, and D typically fall within a range of 155°, 160°, 165° or 170° to 170° or 175°. In the sample embodiment, angles A and D are within a range of 165° to 170°, while angles B and C are within a range of 170° to 175°. Angle A is approximately the same as angle D, and angle B is approximately the same as angle C. Each of angles A and D is different than and somewhat less than each of angles B and C. The difference between each of angles B and C and each of angles A and D is typically no more than 5°, 10° or 15°. Each of angles E and G are typically within a range of 145°, 150° or 155° to 155° to 160° or 165°. In the sample embodiment, each of angles E and G are typically within a range of 155° to 160° or 165°. Angle F is typically within a range of 145°, 150°, 155° or 160° to 165° or 170°. In the sample embodiment, angle F is in a range of 160° to 165° or 170°. Each of angles H and I is typically in a range of 130°, 135° or 140° to 140°, 145° or 150°. In the sample embodiment, each of angles H and I is within a range of 135° to 145°. Angles H and I may be the same or within about 5° or 10° of one another. Each of angles J and K are typically within a range of 120°, 125° or 130° to 130°, 135° or 140°. In the sample embodiment, each of angles J and K is within a range of about 125° to 135°. Each of angles L and M are within a range of 115°, 120° or 125° to 125°, 130° or 135°. In the sample embodiment, angle L is in a range of about 120° to 125°. In the sample embodiment, angle N is within a range of about 115° to 125°. Each of angles N and P it typically within a range of about 10° or 15° to 15° or 20°. Angle O is typically within a range of 5° to 10° or 15°. Angle Q is typically within a range of about 30°, 35° or 40° to 40°, 45° or 50°, and in the sample embodiment is about 35° to 45°.

The various angles A-M described above are, as viewed from the side, also defined between various other surfaces, or between the various surfaces and one of peaks 68, or between various of the peaks 68. This is because some of these surfaces and peaks are parallel to one another. In particular, peak 68 of segment 42A is parallel to top surface 102 of each segment 96A. Peak 68 of segment 42B is parallel to surfaces 102 of segments 96B and surface 94 of assembly 46A lid 88. Peak 68 of segment 42C is parallel to surface 102 of segment 96C and surface 94 of assembly 46B lid 88. Peak 68 of segment 42D is parallel to surface 102 of segment 96D and surface 94 of assembly 46C lid 88. Peak 68 of segment 42E is parallel to surfaces 102 of segments 96E.

Thus, segment 42A peak 68 and segment 42B peak 68 define therebetween angle A. Angle A is also defined between segment 42A peak 68 and each of segment 96B surface 102 and assembly 46A lid 88 surface 94. Angle A is also defined between segment 96a surface 102 and assembly 46A lid 88 surface 94. Angle B is defined between segment 42B peak 68 and segment 42C peak 68. Angle B is also defined between segment 42B peak 68 and each of segment 96C surface 102 and assembly 46B lid 88 surface 94. Angle B is also defined between segment 96B surface 102 and assembly 46B lid 88 surface 94. Angle B is also defined between assembly 46A lid 88 surface 94 and assembly 46B lid 88 surface 94. Angle C is defined between segment 42C peak 68 and segment 42D peak 68. Angle C is also defined between segment 42C peak 68 and each of segment 96D surface 102 and assembly 46C lid 88 surface 94. Angle C is also defined between segment 96C surface 102 and assembly 46C lid 88 surface 94. Angle C is also defined between assembly 46B lid 88 surface 94 and assembly 46C lid 88 surface 94. Segment 42D peak 68 and segment 42E peak 68 define therebetween angle D. Angle D is also defined between segment 42E peak 68 and each of segment 96D surface 102 and assembly 46C lid 88 surface 94. Angle D is also defined between segment 96E surface 102 and assembly 46C lid 88 surface 94.

Figure 6:
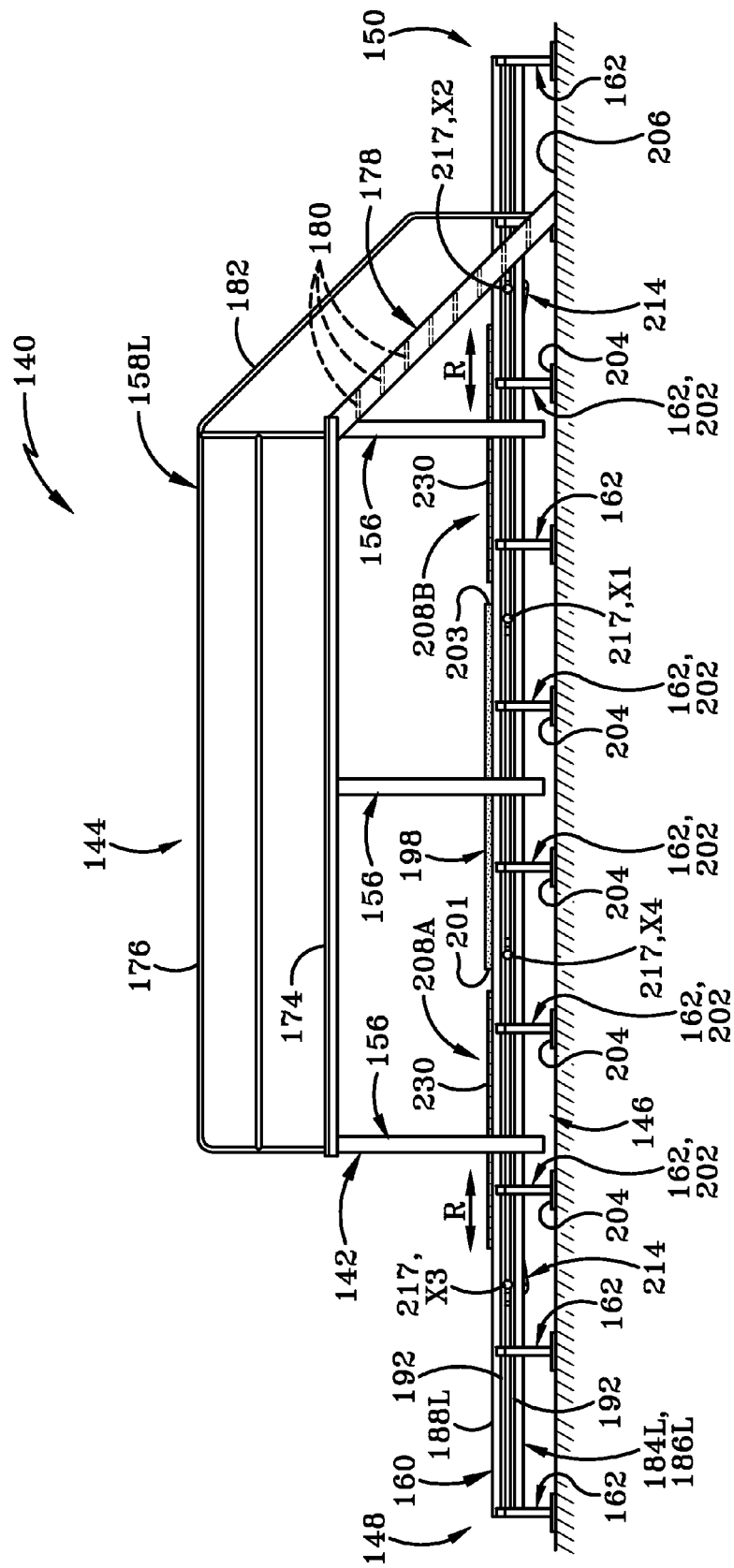
FIG. 6 is a side elevation view of a sample embodiment of the jig used to assemble the storage vessel of the trailer.
Figure 7:
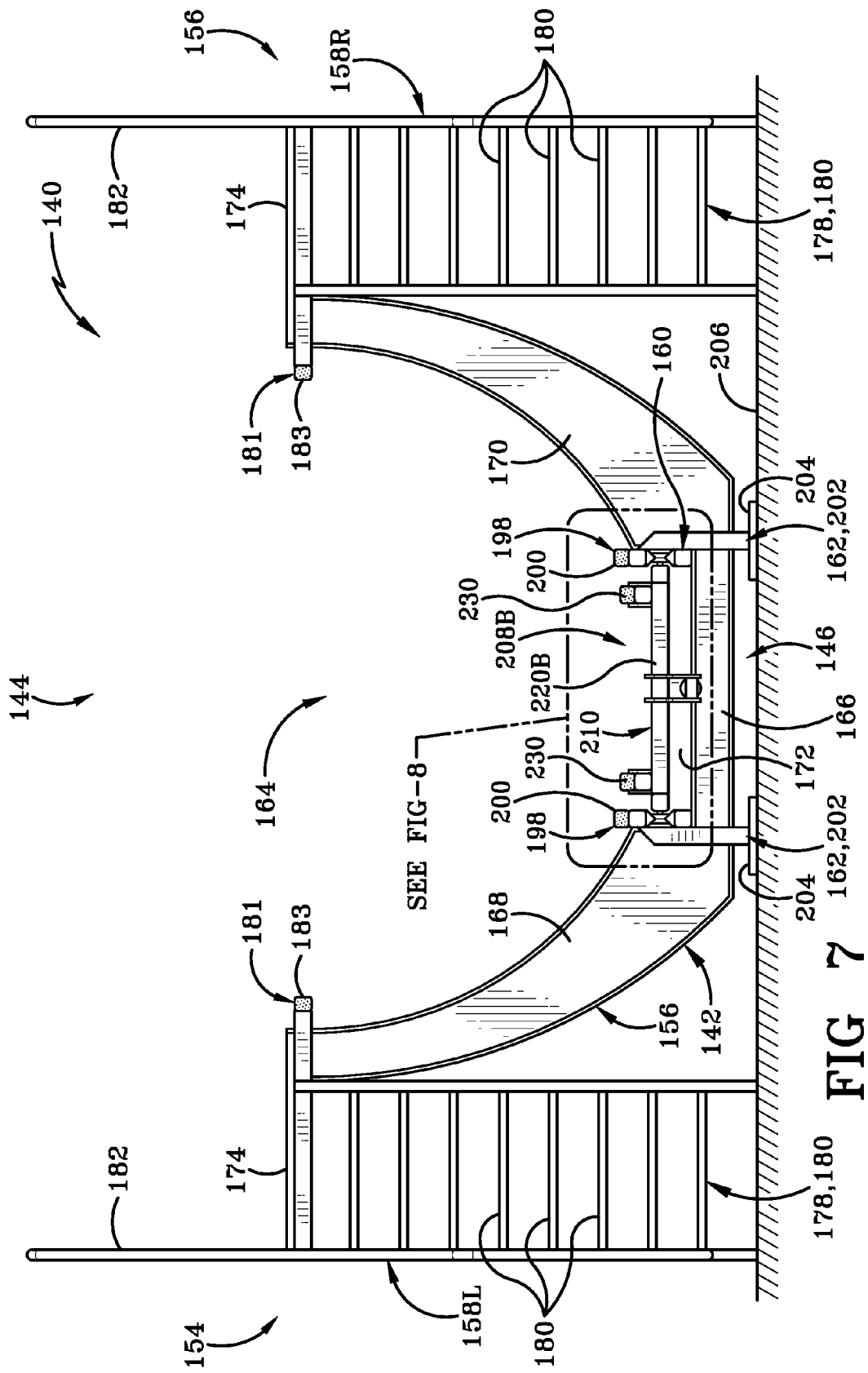
FIG. 7 is a rear elevation view of the jig.

With primary reference to FIGS. 6 and 7, a jig 140 is provided to assist in manufacturing trailer 1 and more directly with manufacturing the storage vessel 26. Jig 140 includes a generally rigid frame 142 which is formed of rigid components which may be, for example, formed of metal. Jig 140 and frame 142 have a top 144, a bottom 146, front and back ends 148 and 150 defining therebetween a longitudinal direction of jig 140 and frame 142 and left and right sides 152 and 154 defining therebetween an axial direction of the jig and frame. Frame 142 includes a plurality of rigid U-shaped beams 156 which are longitudinally spaced from one another, left and right rigid work platforms 158L and 158R which are axially spaced from one another on opposite sides of beams 156, a track assembly 160 secured to beams 156 along the bottom portions thereof between platforms 158L and 158R, and a plurality of pedestals 162 which are rigidly secured to and extend downwardly from track assembly 160. Frame 122 defines a wall-segment or storage-vessel receiving area or space 164 which extends directly above track assembly 160, directly above beams 156, directly above pedestals 162 and axially intermediate or between work platforms 158L and 158R. Space 164 may extend along the entire length of platforms 158 and may extend from adjacent front end 148 to adjacent rear end 150.

Each beam 156 is generally straight and vertical as viewed from the left or right side or in the axial direction and is U-shaped as viewed from the front end or back end or in the longitudinal direction. Each beam 156 has a base or bottom beam segment 166, a left arm or left beam segment 168 and a right arm or right beam segment 170. Bottom segment 166 is generally horizontal as viewed in the longitudinal direction and may have an I-beam structure such that it has an I-shaped configuration or cross section as viewed in the axial direction. Thus, beam 166 may have a vertical web with upper and lower flanges secured to the top and bottom of the web. Left arm 168 and right arm 170 may also have an I-beam structure. Left arm 168 adjacent its right lower end is rigidly secured to the left end of bottom segment 166 and extends upwardly and outwardly to the left therefrom in an arcuate manner to a terminal top end. Similarly, right arm 170 adjacent its left lower end is rigidly secured to the right end of segment 166 and extends upwardly and outwardly to the right therefrom to a terminal top end. U-shaped beam 156 defines a track assembly receiving space 172 which is directly above the top flange of bottom beam segment 166 and is axially elongated from the lower end of left arm 168 to the lower end of bottom arm 170. Space 172 is directly below receiving space 164 and communicates therewith.

Each platform 158 includes a rigid walkway 174, a handrail or guardrail 176, a stairway 178 having a plurality of steps 180, and a stairway handrail 182. Each walkway 174 is substantially horizontal and is rigidly secured to the top end of arms 168, 170. More particular, the left walkway 174 is rigidly secured to the tops of left arms 168, whereas the right walkway 174 is rigidly secured to the tops of right arms 170. Rigid handrail or guardrail 176 is secured to and extends upwardly from walkway 174, such that left rail 176 extends along the left side of walkway 174 and right rail 176 extends along the right side of right walkway 174. Each stairway 178 extends upwardly and forward from the bottom end thereof to the top end which is secured to the back end of the corresponding walkway 174. Railways 182 are secured to and extend upwardly respectively from stairways 178 such that left handrail 182 extends along the left of left stairway 178 and the right handrail 182 extends along the right of right stairway 178.

Jig 140 also includes a pair of top wall segment engaging members 181 each having a top wall segment engaging surface 183. The left engaging member 181 is secured to the right side or edge of the left walkway 174 and extends to the right therefrom. The engaging surface 183 of the left engaging member 181 faces to the right. The right engaging member 181 is secured to the left side or edge of the right walkway 174 and extends outwardly to the left therefrom. The engaging surface 183 of the right engaging member 181 faces to the left and thus towards the rightward facing surface 183 of the left engaging member 181. Each of engaging members 181 and surfaces 183 is longitudinally elongated and may extend from adjacent the front end to adjacent the back end of the corresponding walkway 174. Engaging members 181 may be in the form of a plastic or a material softer than the metal or the material from which the top wall segments 42 are formed so as not to scratch the outer surface thereof when seated on and in contact with surfaces 200. Thus, engaging member 181 may be in the form of a compressible pad, or may have one or more materials such that the outer surface 200 is defined by an elastomer, a plastic material, a woven material or fabric or any sustainable material which will avoid or minimize scratching outer surfaces 62 while providing sufficient support to the give segment 42.

Figure 8:
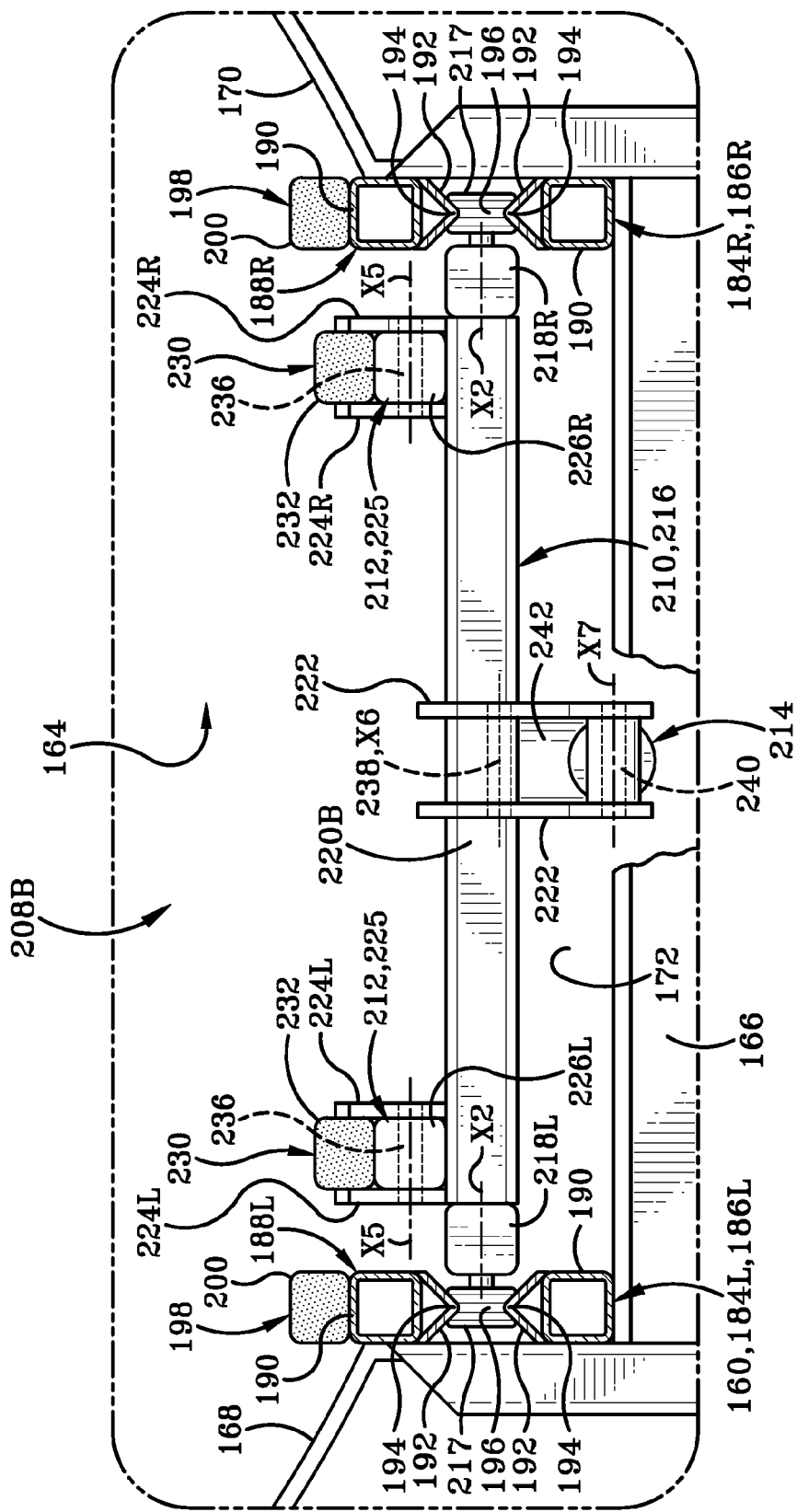
FIG. 8 is an enlarged cross-sectional view of the encircled portion of FIG. 7.
Figure 9:
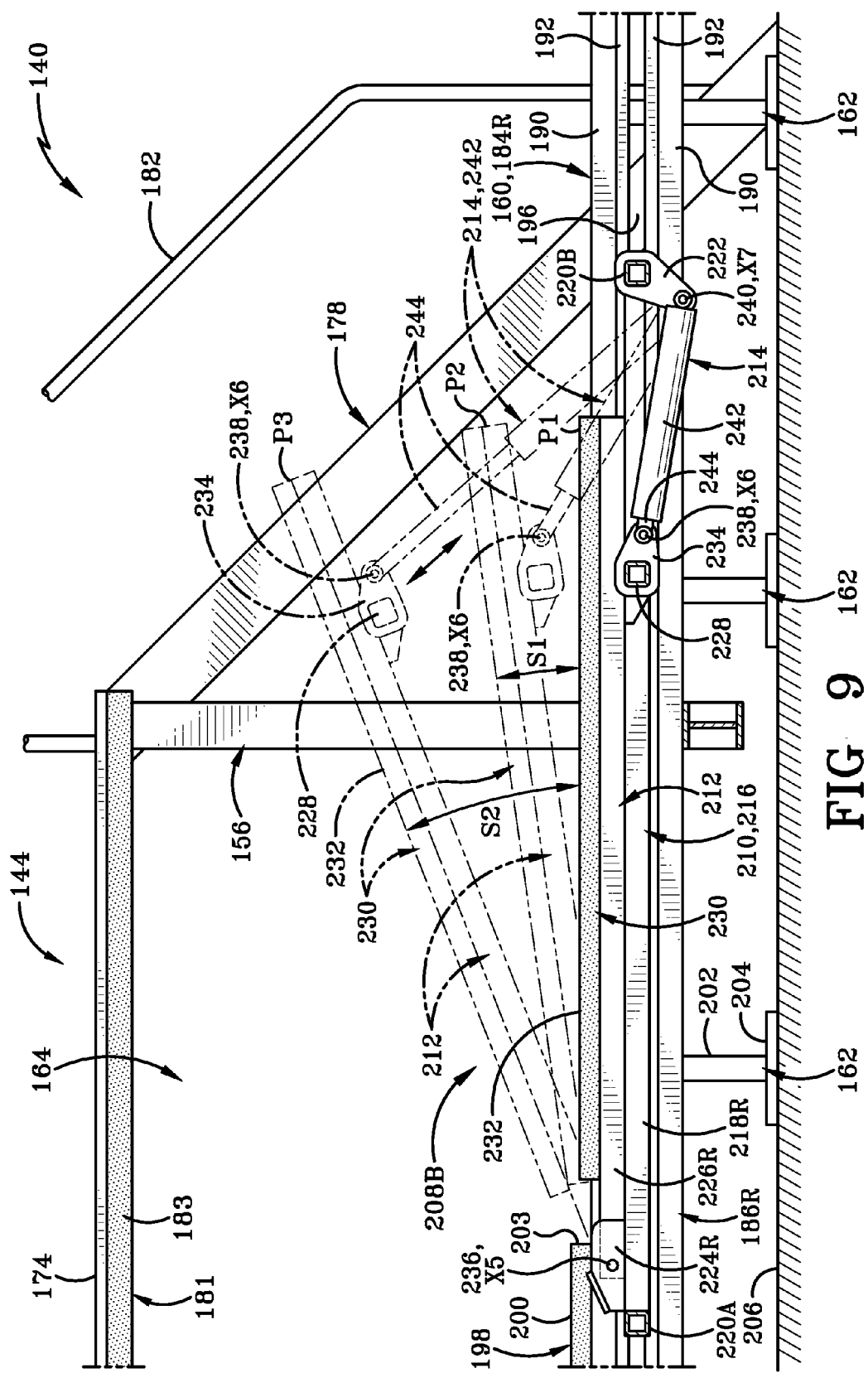
FIG. 9 is a sectional view taken from the side of the jig showing its lift assembly in various positions in solid and dashed lines.

With primary reference to FIGS. 8 and 9, track assembly 160 is received within the receiving space 172 and includes left and right tracks 184L and 184R which are axially spaced from one another. Left track 184L is positioned within the left side of space 172 and is rigidly secured to each U-shaped beam 156 along the left end and top of lower beam segment 166 and the lower right end of left arm 168. Right track 186R is received in the right end of space 172 and may be rigidly secured to the right end of beam section 166 atop segment 166 and along the lower left end of right arm 170. Left and right tracks 184L and 184R respectively include lower rails 186L and 186R, and upper rails 188L and 188R. Each of track 184 and rails 186 and 188 are straight and longitudinally elongated from adjacent front end 148 to adjacent back end 150. These tracks and rails are parallel to one another. Each of rails 186 and 188 may include a rigid beam or tube 190, which may for example have a square cross sectional shape. Each of rails 186 and 188 in the sample embodiment also includes an angle iron 192 having a peak 194. The angle iron 192 of left lower rail 186L is rigidly secured to and extends upwardly from the top of beam 190 such that peak 194 is in an upright position and points upwardly. Likewise, the angle iron 192 of right lower rail 186R is rigidly secured to and extends upwardly from the top of the corresponding beam 190 such that the peak 194 is upright and points upwardly. Angle iron 192 of upper left rail 188L is rigidly secured to and extends downwardly from corresponding beam 190 such that the peak 194 is inverted and points downwardly directly above peak 194 of lower left rail 186L. The angle iron 192 of upper right rail 188R is rigidly secured to and extends downwardly from the tubular beam 190 of rail 188R such that the peak 194 of said angle iron 192 is inverted and thus points downwardly directly above peak 194 of lower right rail 186R. Upper and lower rails 186 and 188 of tracks 184L and R define therebetween respective wheel receiving spaces 196 which extends substantially along the entire length of each of tracks 184 and rails 186 and 188. Space 196 extends from adjacent front end 148 to adjacent rear end 150.

A top wall segment engaging member 198 is secured to and extends upwardly from the top of beam 190 of each upper rail 188L and 188R and includes a top wall segment engaging surface 200. Surface 200 of each engaging member 198 is configured to engage the outer surface of top rail segment 42C of storage vessel 26, as shown and described further below with reference to FIG. 11. Surfaces 200 may also be a configured to contact the outer surface of additional top wall segments. Engaging members 198 may be formed of the materials noted above with respect to engaging members 181. Engaging member 198 has front and back ends 201 and 203 (FIG. 6) between which member 198 is straight and longitudinally elongated. Engaging members 198 are parallel to one another. Members 198 are also parallel to the various rails 186 and 188 of tracks 184. The engaging surface 200 of the left engaging member 198 faces generally upwardly and to the right whereas the engaging surface 200 of the right engaging member 198 faces upwardly and to the left.

Pedestals 162 include a plurality of left pedestals and a plurality of right pedestals which are axially spaced from one another. Each of the left pedestals is longitudinally spaced from one another, as are the right pedestals 162. Each pedestal 162 includes a rigid leg 202 and a rigid foot 204 which is rigidly secured to and extends radially outwardly from the bottom of leg 202. Foot 204 may be a substantially flat plate which is horizontal and has a bottom surface which engages a floor 206 on which jig 140 is seated. As shown in FIGS. 7 and 8, an upper portion of each leg 202 is rigidly secured to one of tracks 184 and extends downwardly therefrom. Legs 202 of the left pedestals 162 are secured to the left side of the rails 186 and 188 on the left track 184L, while the legs 202 of the right set of pedestals 162 are secured to the right side of the rails 186 and 188 of right track 184R.

With primary reference to FIGS. 6-9, jig 140 further includes a pair of lifts, more particularly, a front lift 208A and a back lift 208B. Each of lifts 208 is essentially identical to the other although the front lift is in a reverse orientation to the rear lift such that they are essentially mirror images of one another. Thus, only one of lifts 208 will be described except for certain of the differences related to the reverse orientation, which will understood by one skilled in the art. Each of lifts 208 is moveable back and forth or forward and rearward in a longitudinal direction (Arrows R in FIG. 6) relative to floor 206 and the various other components of jig 140 and frame 102 previously mentioned. In the sample embodiment, this forward and rearward movement of each lift 208 is substantially horizontal and linear movement. Each lift 208 has a carriage 210, a lift member 212 which is moveable relative to carriage 210 between a lowered home position and any number of raised positions, an actuator 214 which is configured to drive or control movement of lift member 212 between the home position and the various raised positions. The home position of lift member 212 of the rear lift 208B is shown in solid lines in FIG. 9, whereas two different raised positions are shown in dashed lines in FIG. 9. Carriage 210 includes a rigid lift frame 216 which may also be referred to as a base frame or a carriage frame, and also includes a plurality of wheels 217 which are rotatably mounted on frame 216 such that a front pair of the wheels 217 rotates about an axis X1 (FIG. 6) and a back pair of wheels 217 rotates about an axis X2 which is parallel to axis X1. The frame of front lift 208A may likewise include front and rear sets of wheels 217 which respectively rotate about an axis X3 and an axis X4 which are parallel to one another and to axis X1 and X2. In the sample embodiment, axes X1-X4 are axially extending horizontal axes. Each pair of wheels 217 includes a left wheel and a right wheel. Thus, each carriage 210 has a left set of wheels which rollingly engage the left track and a right set of wheels which rollingly engage the right track.

With primary reference to FIGS. 8-9, frame 216 may have left and right longitudinally elongated beams 218L and 218R, front and rear axially elongated rods or crossbars 220A and 220B which extend between and are rigidly secured to beams 218 respectively adjacently the front ends and rear ends of the beams 218. Frame 216 may include actuator mounting flanges 222 and left and right lift member mounting flanges 224L and 224R. In the sample embodiment, flange 222 is rigidly secured to back beam 220B and extends downwardly therefrom, whereas left lift member flange 224L may be rigidly secured to one or both of crossbar 220A and left beam 218L adjacent the front end of said beam. Likewise, the right lift member flange 224R may be secured to one or both of front crossbar 220A and right beam 218R adjacent the front end thereof.

Lift member 212 includes a rigid lift member frame 225 having left and right rigid longitudinally elongated rails or beams 226L and 226R, and an axially elongated crossbar 228 which is rigidly secured thereto between beams 226 generally adjacent the rear ends thereof. Lift member 212 may include a top wall engaging member 230 which may be a pad or the like formed of similar materials as discussed above with respect to engaging member 181. The engaging members 230 have respective top wall engaging surfaces or lift surfaces 232 such that the lift surface 232 of left engaging member 230 faces upwardly and to the right and the lift surface 232 of the right engaging member 230 faces upwardly and to the left.

Frame 225 includes rigid actuator mounting flanges 234 which may be rigidly secured to crossbar 228 and extend outwardly therefrom. In the sample embodiment, lift member 212 is pivotally mounted on lift frame 216 or carriage 210 at left and right pivots 236 which respectively extend between the left pair of flanges 224L and right pair of flanges 224R. Lift member 212 is thereby pivotally mounted on frame 216 and pivotable between the home position and various raised positions shown in FIG. 9. The back end of lift member 212 moves upwardly and downwardly during this pivotal movement such that the rear end is in a lowered or lowest position in the home position and the rear end is at the various heights above or higher than the lowered home position in the various raised positions. The front end of actuator 214 is pivotally connected to frame 216 of lift member 212 via a pivot 238 which extends between mounting flanges 234. Actuator 214 adjacent the opposite rear end thereof is pivotally mounted to frame 216 adjacent the rear end thereof via a pivot 240 which extends between mounting flanges 222. Thus, lift member 212 pivots about an axially extending horizontal axis X5 extending through pivot 236, while actuator 214 and lift member 212 are pivotable relative to one another via another axially elongated horizontal axis X6 passing through pivot 238, and actuator 214 is pivotable relative to frame 216 about another axially extending horizontal axis X7 passing through pivot 240. Thus, axes X1-X7 are all substantially parallel to one another.

Actuator 214 may be a piston-cylinder combination including a cylinder 242 and a piston 244 which is slidably received with a cylinder 242 and extendable and retractable relative to cylinder 242. The rear end of cylinder 242 is pivotally mounted at pivot 240, and the front of piston 244 is pivotally mounted at pivot 238. Actuator 214 is typically a hydraulic or pneumatic cylinder which is connected to a hydraulic or pneumatic motor to drive or control actuation of actuator 214. Actuator 214 may thus be operated to move lift member 212 between the home position P1 shown in solid lines in FIG. 9, a first raised position P2 shown in dashed lines in FIG. 9, and a second raised position P3 shown in dashed lines P3 in FIG. 9. In position P2, the rear end of lift member 212 is higher than in position P1, while the rear end of lift member 212 in position P3 is higher than in both positions P1 and P2. Beams 226, engaging member 230 and surface 232 may be substantially horizontal in home position P1, are at a first angle S1 relative to horizontal in position P2 and at a second angle S2 relative to horizontal in position P3, such that angle S2 is greater than angle S1. Angle S1 is typically within a range of 5° or 10° to 10°, 15°, 20° or 25°, and in the sample embodiment is within a range of about 5° to 10°. Angle S2 is typically within a range of about 15° or 20° to 20°, 25°, 30° or 35°, and in the sample embodiment is within a range of about 15° to 25°.

Figure 11:
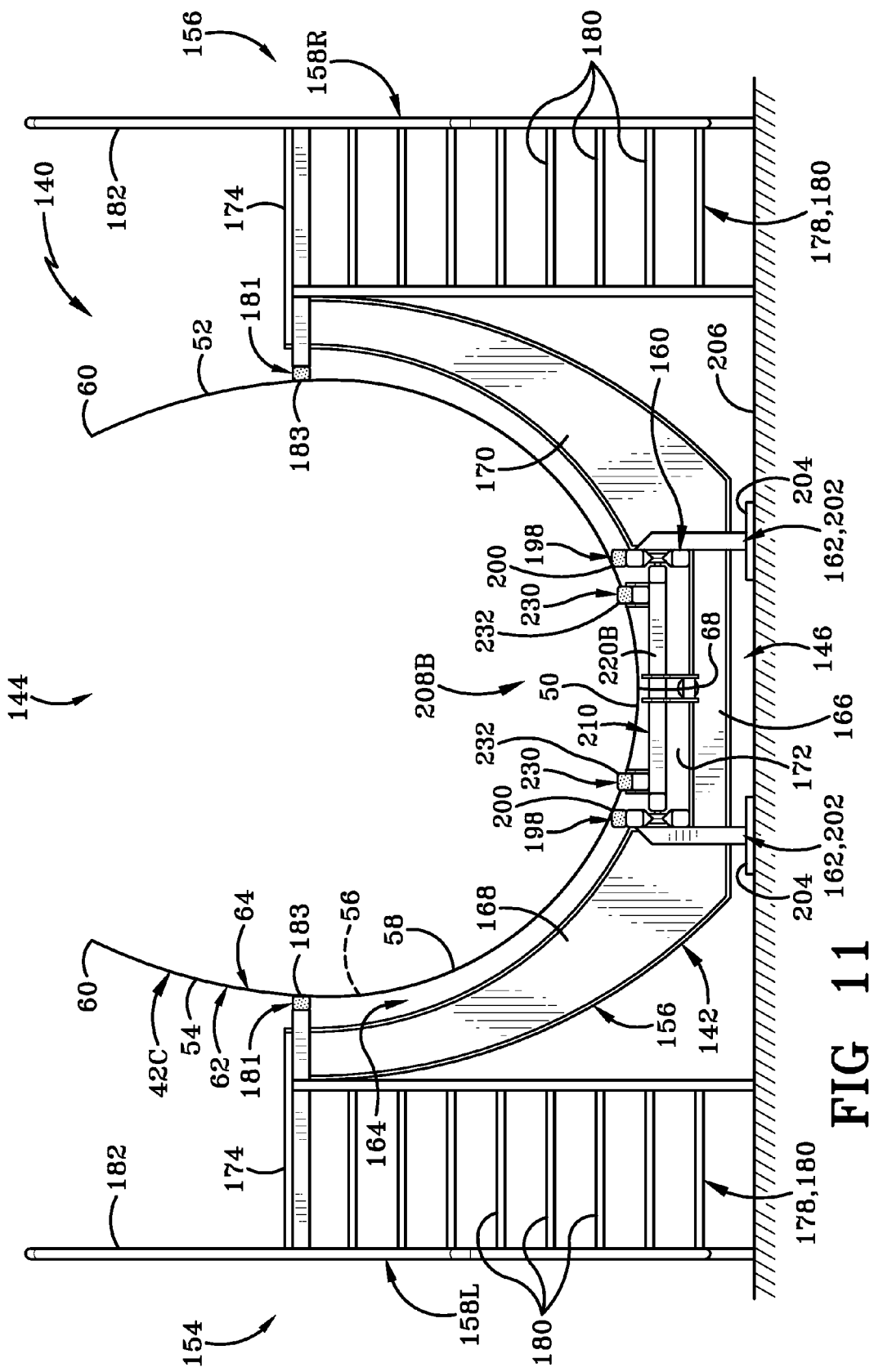
FIG. 11 is a rear elevation view of the jig showing the top wall segment of FIG. 10 in the jig.

The method of manufacturing trailer 1 is now described with reference to FIGS. 10-17. It will be understood by one of skill in the art that the various steps of the manufacturing process may be performed in an order different than that described herein. The various components (such as segments 42 and 44) used in forming vessel 26 are initially separate from one another prior to the steps of manufacturing. Referring now to FIGS. 10 and 11, top wall segment 42C is positioned by any suitable means so that it is in an inverted position seated atop support or engaging surfaces 200 and engaging members 198 within receiving space 164 of jig 140. In this inverted position, bottom edges 60 temporarily serve as top edges and thus face upwardly. Segment 42C is shown with front edge 56 facing forward and rear edge 58 facing rearward, although segment 42C could be turned around in the other direction such that edge 56 faced rearwardly and edge 58 faced forward. However, the description of the process will be discussed with respect to the orientation in the figures for simplicity. In the inverted position of segment 42C shown in FIGS. 10 and 11, outer surface 62 of top wall portion 50 (temporarily serving as a bottom wall portion) is seated on and in contact with surfaces 200 with peak 68 essentially centered midway between and parallel to surfaces 200, members 198, and left and right tracks 184L and 184R. In addition, outer surface 62 of left wall portion 52 is in contact with engaging surface 183 of right engaging member 181, and outer surface 62 of right wall portion 54 is in contact with surface 183 of left engaging member 181. Portions of the left and right sidewall portions 52 and 54 extend upwardly beyond and thus higher than engaging members 181 and walkways 174 such that edges 60 are entirely higher than engaging members 181 and walkways 174. In the inverted position of segment 42C, all portions of segment 42C may be said to be inverted, such as its peak 68, top wall portion 50 and sidewalls 52 and 54. This may also be said of the other segments 42 in their respective inverted positions discussed hereafter.

Figure 12:
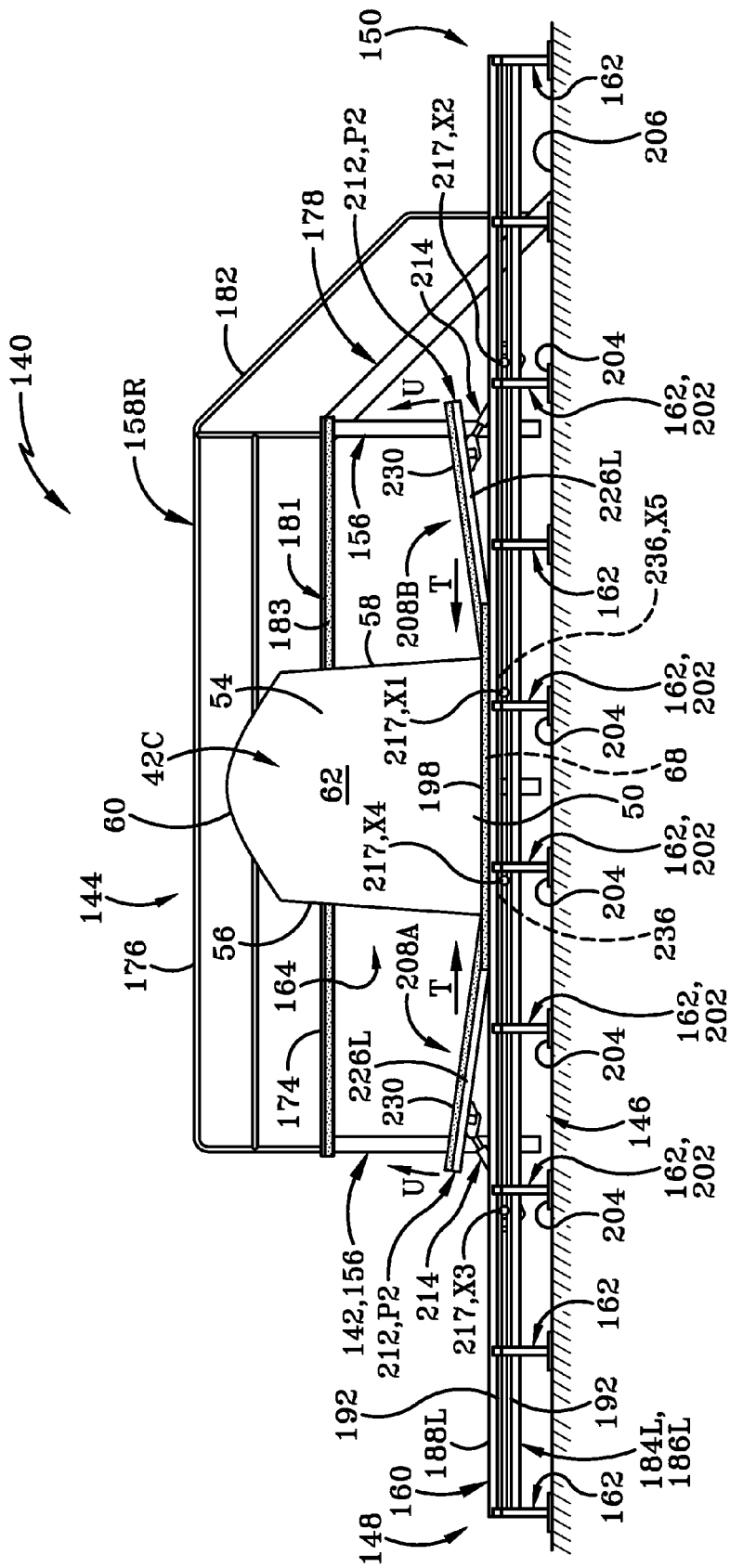
FIG. 12 is similar to FIG. 10 showing the lifts of the jig elevated to lower raised positions.

As shown in FIG. 12, lifts 208A and 208B move longitudinally toward one another (Arrows T) from the respective lift position shown in FIG. 10 to different lift positions shown in FIG. 12. More particularly, front lift 208A is shown having moved rearwardly and rear lift is shown having moved forward. Such movement may be facilitated by the rolling engagement of wheels 217 of the lift carriages with angle irons 192 of the respective tracks 184L and 184R. It is noted that upper rails 188 serve as blocking members which extend directly above corresponding wheels 217 to limit upward movement of wheels 217, frame 216, and carriage 210 to prevent derailment thereof from the respective tracks. Other blocking members which extend directly above other portions of carriage 210 may alternately be provided to the same effect. In the respective lift positions of lifts 208A and 208B shown in FIG. 12, actuators 214 have been powered to drive the movement of lift members 212 to a position such as position P2 also shown in FIG. 9. The lifting movement or upward movement of the front end of lift member 212 of front lift 208A and the back end of lift member 212 of lift 208B is shown at Arrows U in FIG. 12. The movement of lift members 212 to position P2 may occur before or after the movement of lifts 208 to the positions shown in FIG. 12.

Figure 13:
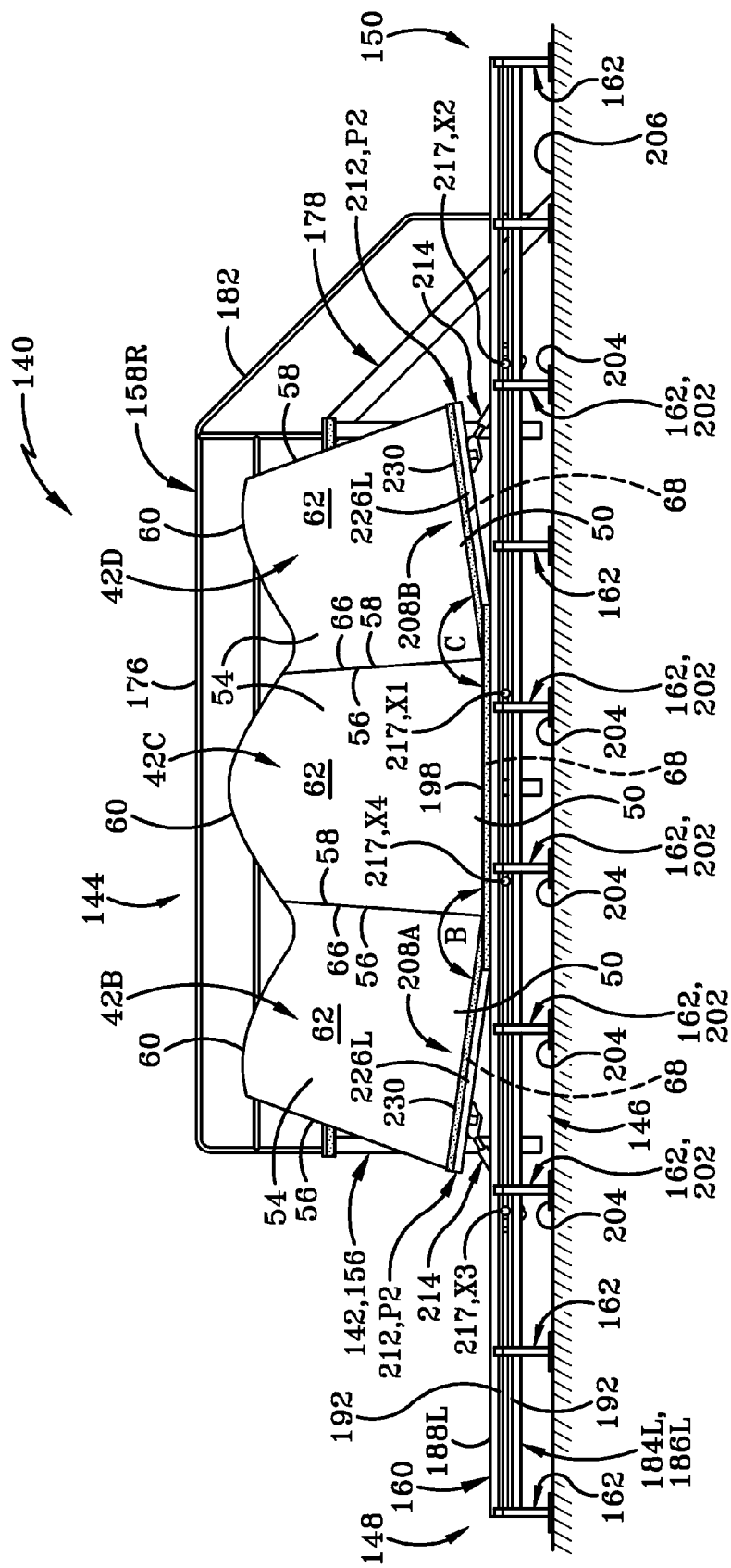
FIG. 13 is similar to FIG. 12 and shows two more top wall segments positioned on the lifts.

FIG. 13 shows top wall segments 42B and 42D having been placed atop the lift members 212 of lifts 208A and 208B respectively such that each of segments 42B and 42D is in an inverted position whereby the top wall portions 50 temporarily serve as bottom wall portions, left sidewall portions 52 are adjacent or in contact with surface 183 of the right engaging member 181, the right sidewall portions 54 are adjacent or in contact with surface 183 of the left engaging member 181, the bottom edges 60 of segments 42B and 42D serve temporarily as top edges which face upwardly, and outer surface 62 of wall portions 50 of segments 42B and 42D are seated on and in contact with engaging surfaces 232 of engaging members 230 of the corresponding lift 208. The peaks 68 of segments 42B and 42D are respectively approximately midway between and parallel to the surfaces 232 and members 230 of the corresponding lift such that each of these peaks 68 is inclined at angle S1 (FIG. 9). More particularly, each of the surfaces 232 and members 230 of rear lift 208B and segment 42D peak 68 angle upwardly and rearwardly, whereas each of the surfaces 232 and members 230 of front lift 208A and segment 42B peak 68 angle upwardly and forward.

While segments 42B and 42D are seated on lifts 208 as shown in FIG. 13, segment 42B back edge 58 in its entirety is closely adjacent or in contact with segment 42C front edge 56 in its entirety, and segment 42C back edge 58 in its entirety is closely adjacent or in contact with segment 42D front edge 56 in its entirety. While segments 42B and 42D are respectively seated on lifts 208 as shown in FIG. 13, segment 42B back edge 58 and segment 42C front edge 56 are welded to one another, as are segment 42C back edge 58 and segment 42D front edge 56. Although a continuous weld such as welds 66 previously discussed in the description of the trailer may be formed at this juncture, more typically the front and back edges of the segments noted above are tack welded or welded to one another with a non-continuous weld while segments 42B and 42D are on the lifts as shown in FIG. 13, and the continuous weld 66 is formed later as discussed below. The welding of the three segments 42B-42D while on the lifts 208 thus secures them to one another.

When segments 42B and 42D are on lifts 208 in positions P2 as shown in FIG. 13 (before and after welding segments 42B-D together), segment 42B peak 68 and segment 42C peak 68 define therebetween angle B. In addition, front lift 208A lift surface 232 and each of segment 42C peak 68 and engaging member 198 engaging surface 200 define therebetween angle B. Also, segment 42D peak 68 and segment 42C peak 68 define therebetween angle C; and back lift 208B lift surface 232 and each of segment 42C peak 68 and engaging member 198 engaging surface 200 define therebetween angle C.

Figure 14:
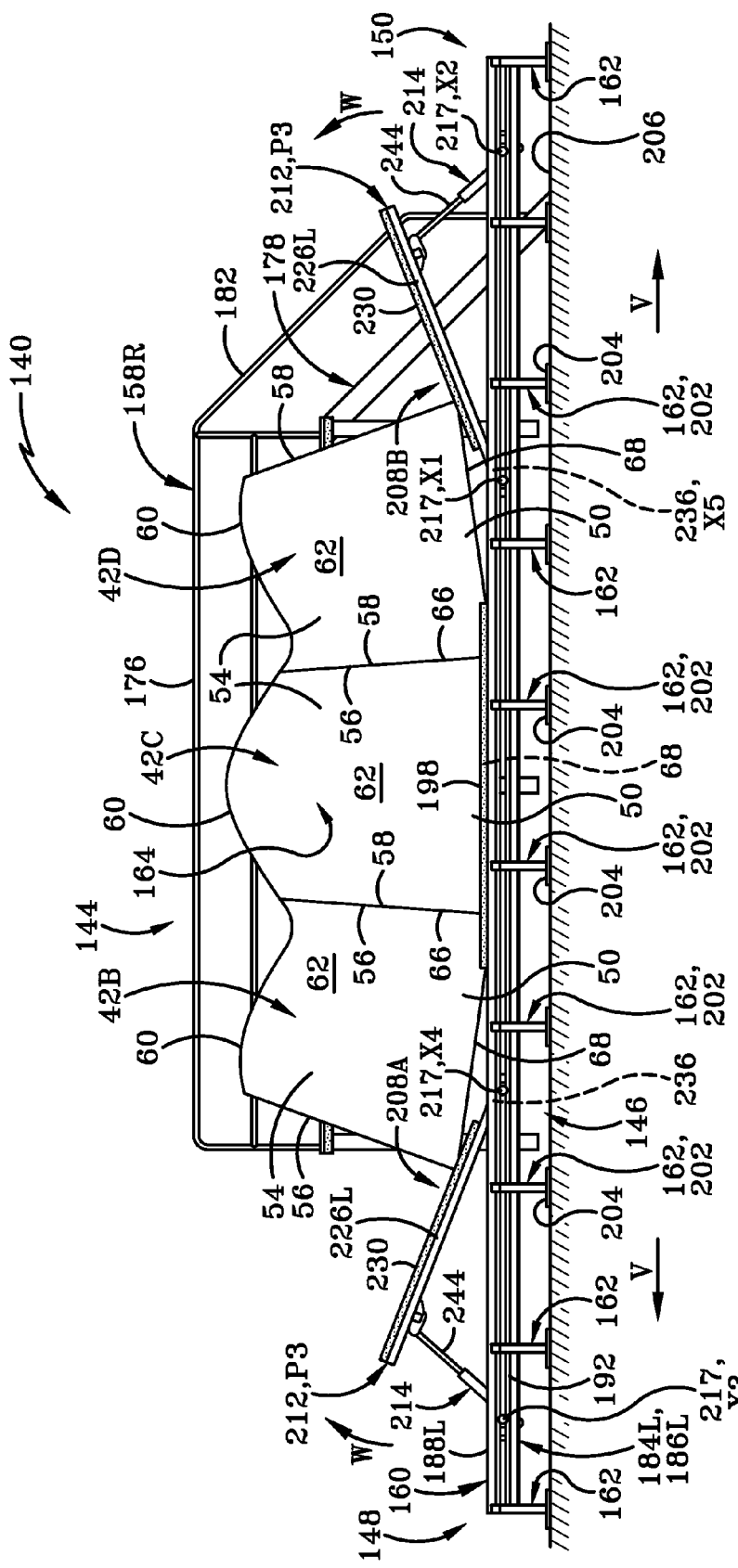
FIG. 14 is similar to FIG. 13 and shows the lifts having moved to different lift positions and having been further elevated to higher lift positions.

As shown in FIG. 14, after segments 42B and 42D are secured to segment 42C to form a rigid structure of the three top wall segments 42, lifts 208 may move away from one another (Arrows V) to different lift positions from those shown in FIG. 13. Actuators 214 are actuated to pivotally move lift members 212 to position P3 as previously discussed with respect to FIG. 9. Again, the movement of the lifts may be facilitated by rolling wheels 217 along track assembly 160. More particularly, front lift 208A moves forward from the lift position of FIG. 13 to the lift position of FIG. 14, which is directly forward of the lift position of FIG. 13. The lifting actuation of actuator 214 of front lift 208A via extension of its piston causes the front end of lift member 212 to pivot upwardly about the pivot 236 (which is adjacent the back of lift member 212) from the lower position P2 to the higher position P3. Rear lift 208B is moved rearwardly from the lift position of FIG. 13 to the lift position of FIG. 14, which is directly rearward of the position of FIG. 13. Actuator 214 of rear lift 208B is actuated so that the rear end of lift member 212 of back lift 208B pivots upwardly and forward about the pivot 236 (which is adjacent the front of lift member 212) from position P2 in FIG. 13 to position P3 of FIG. 14.

At this stage (FIG. 14), outer surface 62 of wall portion 50 of segment 42B adjacent front edge 56 thereof is in contact with surfaces 232 of engaging members 230 of front lift 208A while the remainder of outer surface 62 of segment 42B is out of contact with said surfaces 232. Likewise, outer surface 62 of wall portion 50 of segment 42D adjacent back edge 58 thereof is in contact with surfaces 232 of the back lift while the remaining portions of outer surface 62 are out of contact with surfaces 232. This is a change from the positions of FIG. 13 in which outer surface 62 of portion 50 of segment 42B is in contact with front lift 208A surfaces 232 from adjacent segment 42B front edge 56 and the front end of the front lift surfaces 232 to adjacent segment 42B back edge 58 and the back end of the front lift surfaces 232, and in which outer 62 of portion 50 of segment 42D is in contact with back lift 208B surfaces 232 from adjacent segment 42D front edge 56 and the front end of the back lift surfaces 232 to adjacent segment 42D back edge 58 and the back end of back lift surfaces 232.

Figure 15:
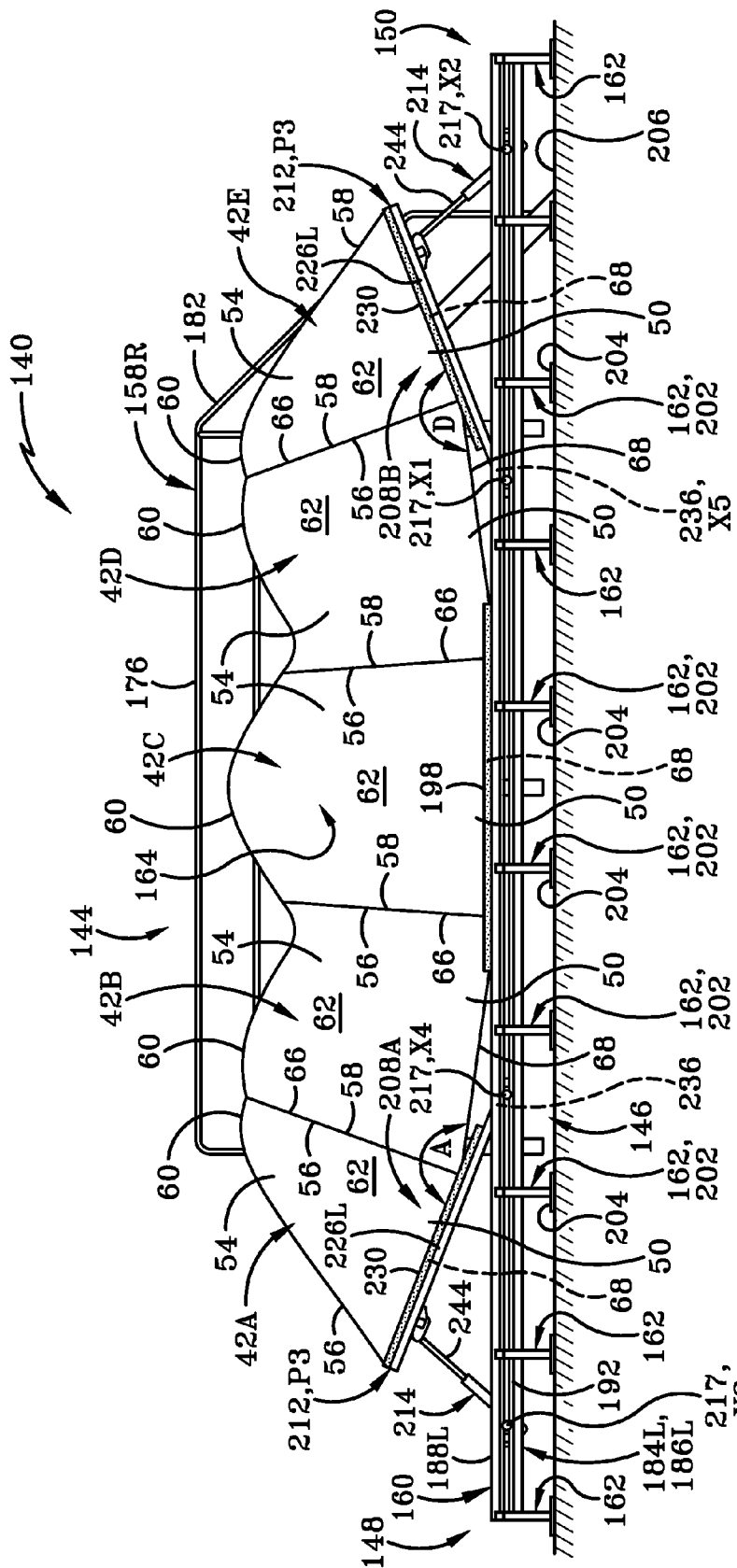
FIG. 15 is similar to FIG. 14 and shows top two more top wall segments positioned on the lifts.

FIG. 15 shows segments 42A and 42E respectively atop the lift members of the front and back lifts with the lift members at position P3. Segments 42A and 42E may be placed atop the lift members of the front and back lifts while the lifts are in position P3, or segments 42A and 42E may be positioned atop the respective lifts when the lifts are in a lower raised position or in the lowered hold position, whereby the lift members 212 may be moved upwardly by actuators 214 to lift segments 42A and 42E which is the position shown in FIG. 15. At the stage shown in FIG. 15, top wall segments 42A and 42E are in inverted positions similar to the other inverted top wall segments so that, for example, the top wall portions 50 of segments 42A and 42E temporarily serve as bottom wall portions and bottom edges 60 temporarily serve as top edges. In the position of FIG. 15, segment 42A back edge 58 in its entirety is closely adjacent or in contact with segment 42B front edge 56 in its entirety. Outer surface 62 of segment 42A wall portion 50 is seated on and in contact with surface 232 from adjacent the back edge 58 of segment 42A to adjacent the front edge 56 of segment 42A and from adjacent the back end of front lift surface 232 and engaging member 230 to adjacent the front end of front lift surface 230 and engaging member 230. Peak 68 of segment 42 is parallel to and essentially midway between surfaces 232 and engaging members 230 of front lift 208A. A rear portion of outer surface 62 of left sidewall portion 52 of segment 42A adjacent back edge 58 thereof is adjacent or may be in contact with surface 183 of right engaging member 181, while a rear portion of outer surface 62 of right sidewall portion 54 of segment 42A adjacent back edge 58 is adjacent or may be in contact with surface 183 of left engaging member 181.

Also in the position of FIG. 15, segment 42E front edge 56 in its entirety is closely adjacent or in contact with segment 42D back edge 58 in its entirety. Outer surface 62 of wall portion 50 of segment 42E is in contact with each of surfaces 232 of the rear lift from adjacent the front edge 56 to the back edge 58 of segment 42E and from adjacent the front end of the back lift surfaces 232 and members 230 to adjacent the back end of back lift surfaces 232 and members 230. Segment 42E peak 68 is essentially midway between and parallel to surfaces 232 and guide members 230 of back lift 208B. A front portion of outer surface 62 of left sidewall portion 52 of segment 42E is adjacent or may be in contact with surface 183 of the right engaging member 181, while a front portion of outer surface 62 of right sidewall portion 54 of segment 42E is adjacent or may be in contact with surface 183 of left engaging member 181.

While segments 42A and 42E are on the front and back lifts in the position shown in FIG. 15, segment 42A is rigidly secured to segment 42B by welding along segment 42A back edge 58 and segment 42B front edge 56. Likewise, segments 42D and 42E are rigidly secured to one another by welding along segment 42D back edge 58 and segment 42E front edge 56. As previously noted, such welding is most likely non-continuous welding or tack welding inasmuch as portions of jig 140 interfere with forming a continuous weld along outer surface 62 along the entirety of the noted front and back edges of the corresponding segments 42. At this stage, the top wall segment portion of vessel 26 is essentially formed other than any additional welding which may be needed to produce the continuous welds between the various five top wall segments 42.

When segments 42A and 42E are on lifts 208 in positions P3 as shown in FIG. 15 (before and after the welding of segments 42A and 42E respectively to segments 42B and 42D), segment 42A peak 68 and segment 42B peak 68 define therebetween angle A. In addition, front lift 208A lift surface 232 and segment 42B peak 68 define therebetween angle A. Also, segment 42E peak 68 and segment 42D peak 68 define therebetween angle D; and back lift 208B lift surface 232 and segment 42C peak 68 define therebetween angle D.

Figure 16:
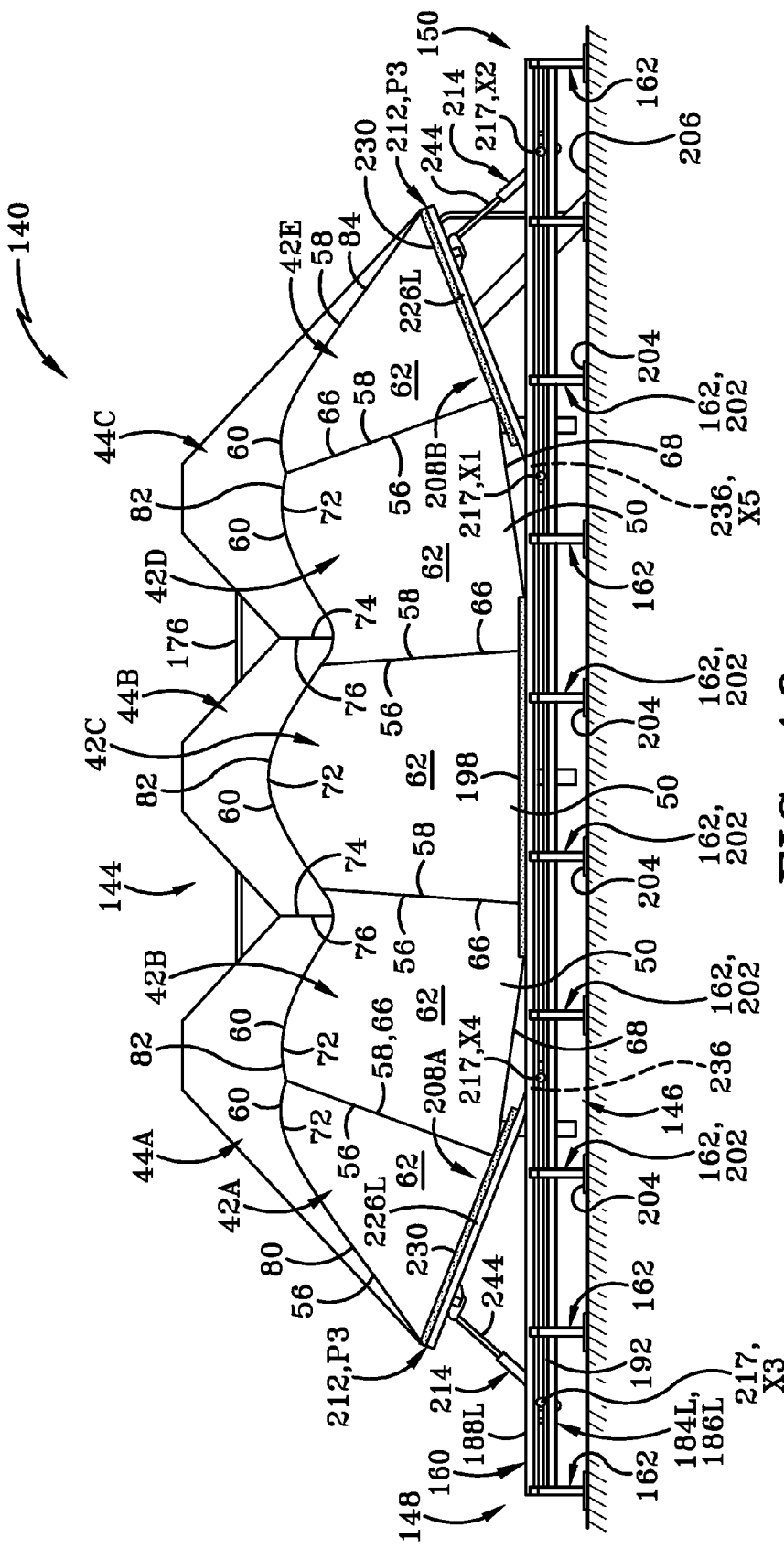
FIG. 16 is similar to FIG. 15 and shows bottom wall segments in an inverted or upside down position atop the inverted top wall segments.

While the lifts 208 remain in the same position as FIG. 15, the bottom wall segments 44A-C are secured to the top wall segments 42A-E as shown in FIG. 16. More particularly, segments 44 are moved into respective inverted positions such that top edges 72 temporarily serve as bottom edges. Thus, bottom wall segment 44A edge 72 in its entirety is closely adjacent or in contact with edges 60 of segments 42A and 42B and front edge 56 of segment 42A. Edge 72 of segment 44B is closely adjacent or in contact with segment 42C edge 60 in its entirety and a rear portion of edge 60 of segment 42B and a front portion of edge 60 of segment 42D. Segment 44C edge 72 in its entirety is closely adjacent or in contact with edges 60 of segments 42D and 42E and with back edge 58 of segment 42E. Segment 44A back edge 74 in its entirety is closely adjacent or in contact with segment 44B front edge 76 in its entirety. Segment 44B back edge 74 in its entirety is closely adjacent or in contact with segment 44C front edge 76 in its entirety. While segments 44A-C are positioned as shown in FIG. 16, they are welded to one another and the top wall segments 42 along the various edges that are closely adjacent or in contact with one another as noted above. As previously discussed, this welding may be non-continuous or tack welding, or may be continuous welding which provides continuous welds 78, 80, 82, and 84.

Figure 17:
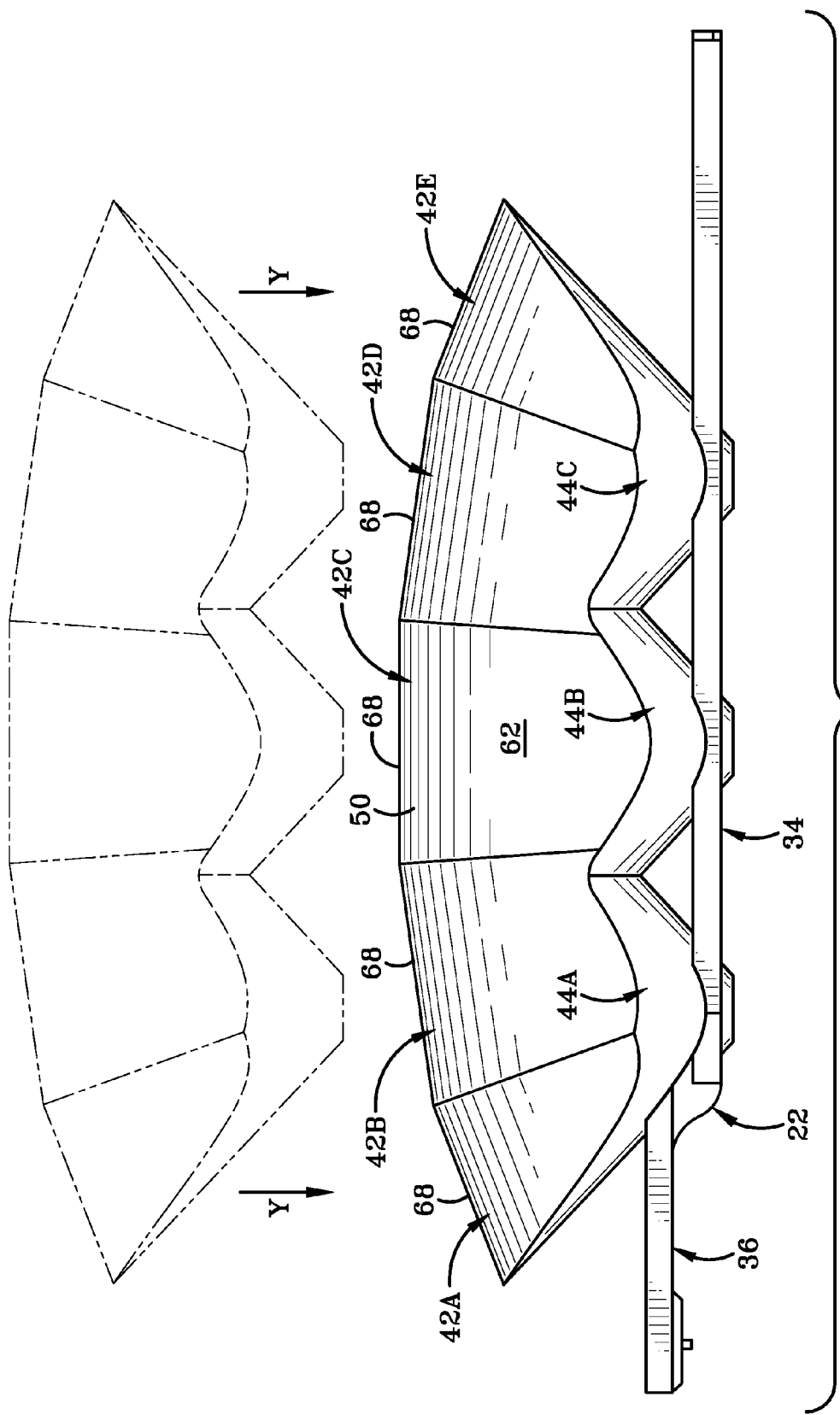
FIG. 17 is a side elevation view of the primary components of the storage vessel removed from the jig and turned over or rotated 180 degrees into an upright position and being mounted on a trailer frame.

FIG. 17 shows that welded structure formed of the primary components of vessel 26 (segments 42 and 44) has been removed from jig 140 (whether the welds are in partial or completed state) and turned over from its inverted position into an upright position and rigidly secured to frame 22. Arrows Y in FIG. 17 illustrate the relative movement between vessel 26 and the frame 22 in order to move them from a separated position in which they are separate from one another to a joined position in which they are joined to one another and rigidly secured to one another by welding or other means known in the art. The various other components are also mounted to vessel 26 and/or frame 22 in order to complete the formation of trailer 1. More particularly, landing gear 25 and the wheel assembly including wheels 24 are mounted on the frame, discharge port assemblies 49 are secured to the respective lower ends of the cones or bottom wall segments 44, aeration pipe 32 is mounted on the discharge assemblies 49, fill port assemblies 46 and toe rails 48 are secured along the top of vessel 26, front housing 28 is secured to the front portion 36 of frame 22 and the front portion of vessel 26, rear housing 30 is secured to the back portion 34 of frame 22 and back portion of vessel 26, and steps 128 and handrails 130 are secured in position as well, along with any other components. It is noted that various parts of an aeration system or pneumatic system have not been shown in the drawings which typically connect to the front of aeration pipe 32 and may include pipes which are housed within front housing 28 and in communication with interior chamber 39 of vessel 26. Such piping is known in the art.

Figure 18:
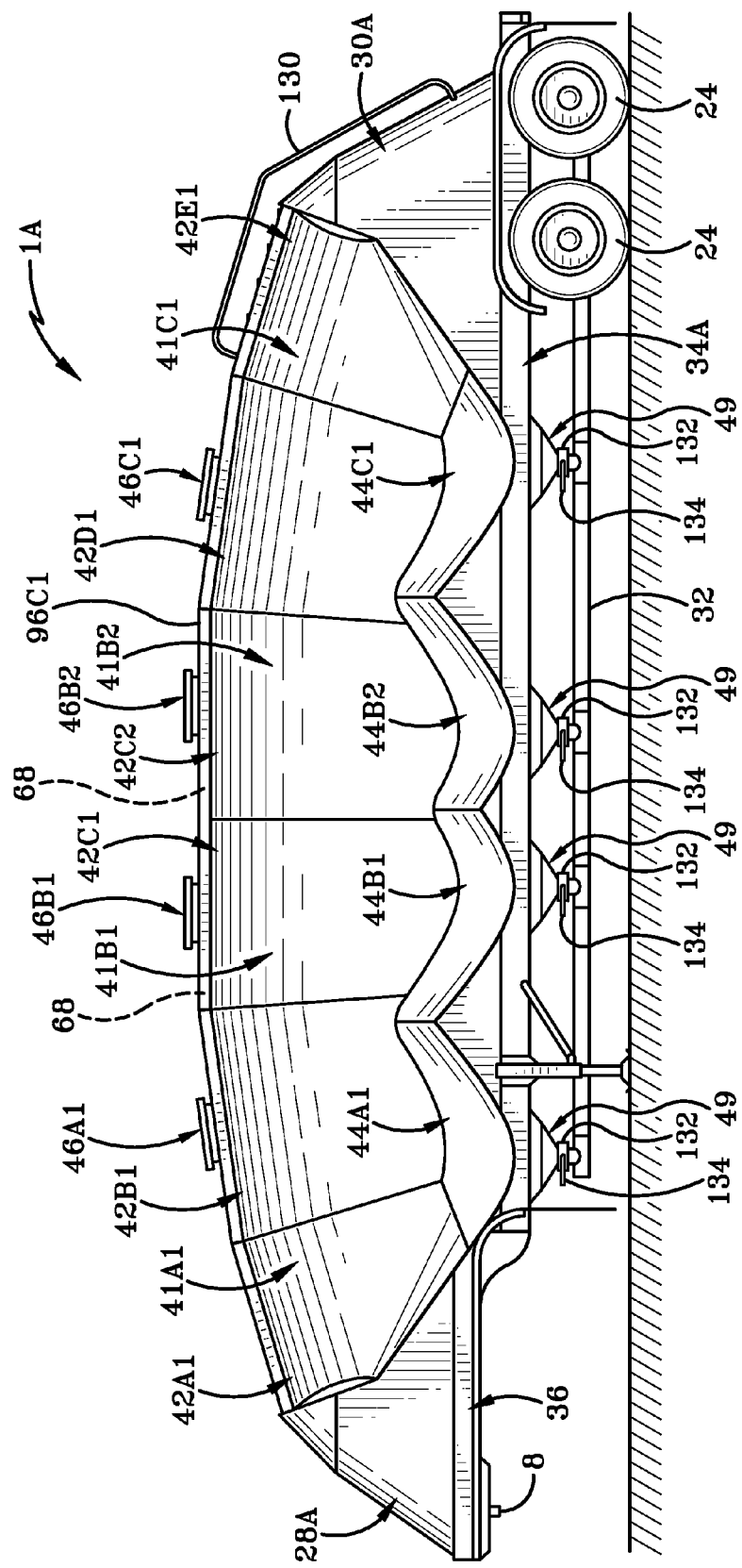
FIG. 18 is a side elevation view of another sample embodiment of a trailer with a storage vessel that has four hoppers.

FIG. 18 shows a second embodiment of a trailer generally at 1A. Trailer 1A is similar to trailer 1 with the primary difference being that trailer 1A includes an additional hopper chamber and is thus longer than trailer 1. Trailer 1A includes a frame which includes a front raised section 36 and a rear lower section 34A which is similar to section 34 except that it is longer. Trailer 1A further includes front and back housings 28A and 30A which are similar to housing 28 and housing 30, although slightly modified. Trailer 1A includes 6 top wall segments, which are denoted at 42A1, 42B1, 42C1, 42C2, 42D1, and 42E1. Trailer 1A also includes four bottom wall segments denoted at 44A1, 44B1, 44B2, and 44C1. The four hopper chambers include hopper chambers 41A1, 41B1, 41B2, and 41C1. Chamber 41A1 is formed primarily from top wall segments 42A1 and 42B1 and bottom wall segment 44A1. Chamber 41B1 is formed primarily from top wall segment 42C1 and bottom wall segment 44B1. Chamber 41B2 is formed primarily from top wall segment 42C2 and bottom wall segment 44B2. Chamber 41C1 is formed primarily from top wall segments 42D1 and 42E1 and bottom wall segment 44C1.

One of the primary differences between trailer A1 and trailer 1 is that top wall segments 42C1 and 42C2 are secured together such that the peak 68 of segment 42C1 and peak 68 and segment 42C2 are collinear and typically horizontal, and thus together essentially form a single peak extending from the front edge of segment 42C1 to the back edge of segment 42C2. In addition, the left and right toe rails of trailer 1A may be formed with 5 segments as in the case with trailer 1. However, each toe rail of trailer 1A may include a central toe rail segment 96C1, which extends from the front edge of segment 42C1 to the back edge of segment 42C2, thus spanning two of the top wall segments instead of one. Trailer 1A also includes four fill port assemblies 46A1, 46B1, 46B2 and 46C1 analogous to those of trailer 1. The top surfaces of the lids of assemblies 46B1 and 46B2 may be coplanar and horizontal. Other than the various differences between trailers 1 and 1A which are obvious from the figures, it is noted that the angles between the various peaks, top surfaces of the toe rails, top surfaces of the lids of the fill port assemblies, and the front and back angled surfaces of housings 28A and 30A are generally similar to those discussed previously with respect to trailer 1. The method of manufacturing trailer 1A is similar to that of trailer 1 except that each of top wall segments 42C1 and 42C2 may be placed in jig 140 in an inverted position atop surfaces 232 of engaging member 230 instead of placing only a single top wall segment thereon as discussed with respect to trailer 1. The remainder of the method of manufacturing is otherwise essentially the same for trailer 1A as for trailer 1.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the sample embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation.

The invention claimed is:

1. A method comprising the steps of:
    providing first, second and third top wall segments to be used in forming a trailer storage vessel; wherein the first, second and third top wall segments are initially separate from one another and have respective front and back edges; each of the top wall segments is curved as viewed from a front of the respective top wall segment; the first top wall segment has a first peak extending from adjacent the front edge of the first top wall segment to adjacent the back edge of the first top wall segment; the second top wall segment has a second peak extending from adjacent the front edge of the second top wall segment to adjacent the back edge of the second top wall segment; and the third top wall segment has a third peak extending from adjacent the front edge of the third top wall segment to adjacent the back edge of the third top wall segment;
    placing the first top wall segment into a jig in a first top wall segment inverted position so that the first peak is inverted;
    positioning the second top wall segment on a first lift of the jig in a second top wall segment inverted position so that the second peak is inverted and so that when the first lift is in a first lift position, the front edge of the second top wall segment is adjacent the back edge of the first top wall segment, and the inverted second peak angles upwardly and rearwardly;
    welding the front edge of the second top wall segment to the back edge of the first top wall segment while the first lift is in the first lift position;
    positioning the third top wall segment on the first lift in a third top wall segment inverted position so that the third peak is inverted and so that when the first lift is in a second lift position rearward of the first lift position, the front edge of the third top wall segment is adjacent the back edge of the second top wall segment, and the inverted third peak angles upwardly and rearwardly; and
    welding the front edge of the third top wall segment to the back edge of the second top wall segment while the first lift is in the second lift position.

2. The method of claim 1 wherein while the third top wall segment is on the first lift in the second lift position, the third peak angles upwardly and rearwardly at a greater incline than does the second peak.

3. The method of claim 1 wherein the first lift comprises a lift frame and a lifting member which is pivotally mounted on the lift frame so that a lift surface of the lifting member is movable upwardly and downwardly via pivoting of the lifting member;
    while the first lift is in the first lift position, the lift surface engages the second top wall segment and angles upwardly and rearwardly at a first angle; and
    while the first lift is in the second lift position, the lift surface engages the third top wall segment and angles upwardly and rearwardly at a second angle different than the first angle.

4. The method of claim 1 further comprising the steps of
    welding a top edge of a first bottom wall segment to a bottom edge of the first top wall segment to form at least part of a first hopper of the storage vessel; and
    welding a top edge of a second bottom wall segment to a bottom edge of the second top wall segment to form at least part of a second hopper of the storage vessel.

5. The method of claim 4 further comprising the steps of removing the storage vessel from the jig;
    turning the removed storage vessel over from the inverted position to an upright position;
    securing the storage vessel to a trailer frame; and
    mounting ground-engaging wheels on the trailer frame.

6. The method of claim 5 further comprising the steps of securing a fill port assembly to a top of one of the top wall segments;

mounting a first discharge port assembly on a bottom of the first hopper; and mounting a second discharge port assembly on a bottom of the second hopper.

7. The method of claim 1 further comprising the steps of providing a fourth top wall segment to be used in forming the trailer storage vessel; wherein the fourth top wall segment is initially separate from the first, second and third top wall segments and has front and back edges; the fourth top wall segment is curved as viewed from a front of the fourth top wall segment; and the fourth top wall segment has a fourth peak extending from adjacent the front edge of the fourth top wall segment to adjacent the back edge of the fourth top wall segment;

positioning the fourth top wall segment on a second lift of the jig in a fourth top wall segment inverted position so that the fourth peak is inverted and so that when the second lift is in a third lift position forward of the first lift position, the back edge of the fourth top wall segment is adjacent the front edge of the first top wall segment, and the inverted fourth peak angles upwardly and forward; and welding the back edge of the fourth top wall segment to the front edge of the first top wall segment while the second lift is in the third lift position.

8. The method of claim 7 further comprising the steps of providing a fifth top wall segment to be used in forming the trailer storage vessel; wherein the fifth top wall segment is initially separate from the first, second, third and fourth top wall segments and has front and back edges; the fifth top wall segment is curved as viewed from a front of the fifth top wall segment; and the fifth top wall segment has a fifth peak extending from adjacent the front edge of the fifth top wall segment to adjacent the back edge of the fifth top wall segment;

positioning the fifth top wall segment on the second lift in a fifth top wall segment inverted position so that the fifth peak is inverted and so that when the second lift is in a fourth lift position forward of the third lift position, the back edge of the fifth top wall segment is adjacent the front edge of the fourth top wall segment, and the inverted fifth peak angles upwardly and forward; and welding the back edge of the fifth top wall segment to the front edge of the fourth top wall segment while the second lift is in the fourth lift position.

9. The method of claim 1 further comprising the step of rolling the first lift on lift wheels from the first lift position to the second lift position.

10. The method of claim 9 wherein the first lift comprises a carriage and a lifting member; the carriage comprises a lift frame on which the lift wheels are rotatably mounted and on which the lifting member is movably mounted so that a lift surface of the lifting member is movable upwardly and downwardly;

the lift surface engages the second top wall segment during the step of positioning the second top wall segment on the first lift; and the step of rolling comprises rolling the lift wheels on a track with a blocking member directly above a portion of the carriage such that the blocking member limits upward movement of the carriage to prevent derailment of the first lift from the track.

11. The method of claim 10 wherein the track comprises upper and lower rails; and the upper rail is directly above and adjacent the lift wheels and serves as the blocking member.

12. The method of claim 1 wherein the first top wall segment comprises a top wall portion, a left sidewall portion and a right sidewall portion; and further comprising the step of while the first top wall segment is in the first top wall inverted position, engaging the top wall portion, the left sidewall portion and the right sidewall portion respectively with first, second and third engaging members of the jig.

13. The method of claim 1 wherein the first and second peaks define therebetween a first obtuse angle as viewed from a side of the jig; and wherein the second and third peaks define therebetween a second obtuse angle as viewed from the side of the jig.

14. The method of claim 13 wherein the second obtuse angle is different than the first obtuse angle.

15. The method of claim 13 wherein each of the first and second obtuse angles is in a range of 155 to 175 degrees.

16. The method of claim 1 further comprising the steps of providing a fourth top wall segment to be used in forming the trailer storage vessel; wherein the fourth top wall segment is initially separate from the first, second and third top wall segments and has front and back edges; the fourth top wall segment is curved as viewed from a front of the fourth top wall segment; and the fourth top wall segment has a fourth peak extending from adjacent the front edge of the fourth top wall segment to adjacent the back edge of the fourth top wall segment;

positioning the fourth top wall segment into the jig in a fourth top wall segment inverted position so that the fourth peak is inverted and so that the back edge of the fourth top wall segment is adjacent the front edge of the first top wall segment; and welding the back edge of the fourth top wall segment to the front edge of the first top wall segment.

17. The method of claim 16 wherein the step of positioning the fourth top wall segment comprises positioning the fourth top wall segment on a second lift of the jig in the fourth top wall segment inverted position so that when the second lift is in a third lift position forward of the first lift position, the back edge of the fourth top wall segment is adjacent the front edge of the first top wall segment, and the inverted fourth peak angles upwardly and forward; and wherein the step of welding the back edge of the fourth top wall segment to the front edge of the first top wall segment occurs while the second lift is in the third lift position.

18. The method of claim 17 further comprising the steps of providing a fifth top wall segment to be used in forming the trailer storage vessel; wherein the fifth top wall segment is initially separate from the first, second, third and fourth top wall segments and has front and back edges; the fifth top wall segment is curved as viewed from a front of the fifth top wall segment; and the fifth top wall segment has a fifth peak extending from adjacent the front edge of the fifth top wall segment to adjacent the back edge of the fifth top wall segment;

positioning the fifth top wall segment on the second lift of the jig in a fifth top wall segment inverted position so that the fifth peak is inverted and so that when the second lift is in a fourth lift position forward of the third lift position, the back edge of the fifth top wall segment is adjacent the front edge of the fourth top wall segment, and the inverted fifth peak angles upwardly and forward; and welding the back edge of the fifth top wall segment to the front edge of the fourth top wall segment while the second lift is in the fourth lift position.

19. The method of claim 1 further comprising the step of securing a plurality of steps to the third top wall segment along the third peak.

20. A method comprising the steps of:
providing first, second and third top wall segments to be used in forming a trailer storage vessel; wherein the first, second and third top wall segments are initially separate from one another and have respective front and back edges; each of the top wall segments is curved as viewed from a front of the respective top wall segment; the first top wall segment has a first peak extending from adjacent the front edge of the first top wall segment to adjacent the back edge of the first top wall segment; the second top wall segment has a second peak extending from adjacent the front edge of the second top wall segment to adjacent the back edge of the second top wall segment; and the third top wall segment has a third peak extending from adjacent the front edge of the third top wall segment to adjacent the back edge of the third top wall segment;

placing the second top wall segment into a jig in a second top wall segment inverted position so that the second peak is inverted;

positioning the first top wall segment on a first lift of the jig in a first top wall segment inverted position so that the first peak is inverted and so that when the first lift is in a first lift position, the front edge of the second top wall segment is adjacent the back edge of the first top wall segment, and the inverted first peak angles upwardly and forward;

welding the front edge of the second top wall segment to the back edge of the first top wall segment while the first lift is in the first lift position;

positioning the third top wall segment on a second lift of the jig in a third top wall segment inverted position so that the third peak is inverted and so that when the second lift is in a second lift position rearward of the first lift position, the front edge of the third top wall segment is adjacent the back edge of the second top wall segment, and the inverted third peak angles upwardly and rearwardly; and welding the front edge of the third top wall segment to the back edge of the second top wall segment while the second lift is in the second lift position.

* * * * *